(12) United States Patent
Sundararajan et al.

(10) Patent No.: US 12,389,363 B2
(45) Date of Patent: Aug. 12, 2025

(54) MEASUREMENT ERROR FEEDBACK TO ENABLE MACHINE LEARNING-BASED POSITIONING

(71) Applicant: QUALCOMM Incorporated, San Diego, CA (US)

(72) Inventors: Jay Kumar Sundararajan, San Diego, CA (US); Alexandros Manolakos, Escondido, CA (US); Taesang Yoo, San Diego, CA (US); Sooryanarayanan Gopalakrishnan, San Diego, CA (US); Naga Bhushan, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 491 days.

(21) Appl. No.: 17/661,399

(22) Filed: Apr. 29, 2022

(65) Prior Publication Data

US 2023/0354254 A1   Nov. 2, 2023

(51) Int. Cl.
    *H04W 4/02*     (2018.01)
    *H04L 25/02*    (2006.01)
    *H04W 4/029*    (2018.01)
    *H04W 64/00*    (2009.01)

(52) U.S. Cl.
    CPC ....... *H04W 64/003* (2013.01); *H04L 25/0224* (2013.01); *H04W 4/029* (2018.02)

(58) Field of Classification Search
    CPC .................... H04W 64/00; H04W 4/02
    See application file for complete search history.

(56) References Cited

U.S. PATENT DOCUMENTS

| 10,908,299 B1 | 2/2021 | Tadayon et al. |
| 2005/0143092 A1* | 6/2005 | Tamaki ................. H04W 64/00 455/456.1 |
| 2019/0104493 A1 | 4/2019 | Hedley et al. |
| 2022/0124665 A1 | 4/2022 | Bao et al. |
| 2024/0129893 A1* | 4/2024 | Si .......................... H04L 5/0048 |

OTHER PUBLICATIONS

International Search Report and Written Opinion—PCT/US2023/064524—ISA/EPO—Jun. 23, 2023.

* cited by examiner

*Primary Examiner* — Michael T Vu
(74) *Attorney, Agent, or Firm* — QUALCOMM Incorporated

(57) ABSTRACT

Disclosed are techniques for wireless communication. In an aspect, a first network node determines at least one positioning measurement based on a channel estimate of a positioning reference signal (PRS) transmitted by a second network node, and obtains measurement error feedback for at least the at least one positioning measurement, wherein the measurement error feedback is based on an expected positioning measurement corresponding to the at least one positioning measurement, and wherein the expected positioning measurement is based on a location of the first network node and a location of the second network node.

28 Claims, 14 Drawing Sheets

MEASUREMENT ERROR FEEDBACK TO ENABLE MACHINE LEARNING-BASED POSITIONING

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a first network node includes determining at least one positioning measurement based on a channel estimate of a positioning reference signal (PRS) transmitted by a second network node; and obtaining measurement error feedback for at least the at least one positioning measurement, wherein the measurement error feedback is based on an expected positioning measurement corresponding to the at least one positioning measurement, and wherein the expected positioning measurement is based on a location of the first network node and a location of the second network node.

In an aspect, a method of communication performed by a location server includes receiving, from a first network node, a measurement report including at least one positioning measurement based on a channel estimate of a positioning reference signal (PRS) transmitted by a second network node; and transmitting measurement error feedback for at least the at least one positioning measurement to the first network node, wherein the measurement error feedback is based on an expected positioning measurement corresponding to the at least one positioning measurement, and wherein the expected positioning measurement is based on a location of the first network node and a location of the second network node.

In an aspect, a first network node includes a memory; at least one transceiver; and at least one processor communicatively coupled to the memory and the at least one transceiver, the at least one processor configured to: determine at least one positioning measurement based on a channel estimate of a positioning reference signal (PRS) transmitted by a second network node; and obtain measurement error feedback for at least the at least one positioning measurement, wherein the measurement error feedback is based on an expected positioning measurement corresponding to the at least one positioning measurement, and wherein the expected positioning measurement is based on a location of the first network node and a location of the second network node.

In an aspect, a location server includes a memory; at least one transceiver; and at least one processor communicatively coupled to the memory and the at least one transceiver, the at least one processor configured to: receive, via the at least one transceiver, from a first network node, a measurement report including at least one positioning measurement based on a channel estimate of a positioning reference signal (PRS) transmitted by a second network node; and transmit, via the at least one transceiver, measurement error feedback for at least the at least one positioning measurement to the first network node, wherein the measurement error feedback is based on an expected positioning measurement corresponding to the at least one positioning measurement, and wherein the expected positioning measurement is based on a location of the first network node and a location of the second network node.

In an aspect, a first network node includes means for determining at least one positioning measurement based on a channel estimate of a positioning reference signal (PRS) transmitted by a second network node; and means for obtaining measurement error feedback for at least the at least one positioning measurement, wherein the measurement error feedback is based on an expected positioning measurement corresponding to the at least one positioning measurement, and wherein the expected positioning measurement is based on a location of the first network node and a location of the second network node.

In an aspect, a location server includes means for receiving, from a first network node, a measurement report including at least one positioning measurement based on a channel estimate of a positioning reference signal (PRS) transmitted by a second network node; and means for transmitting measurement error feedback for at least the at least one positioning measurement to the first network node, wherein the measurement error feedback is based on an expected positioning measurement corresponding to the at least one positioning measurement, and wherein the expected positioning measurement is based on a location of the first network node and a location of the second network node.

In an aspect, a non-transitory computer-readable medium stores computer-executable instructions that, when executed by a first network node, cause the first network node to: determine at least one positioning measurement based on a channel estimate of a positioning reference signal (PRS) transmitted by a second network node; and obtain measurement error feedback for at least the at least one positioning measurement, wherein the measurement error feedback is based on an expected positioning measurement corresponding to the at least one positioning measurement, and wherein the expected positioning measurement is based on a location of the first network node and a location of the second network node.

In an aspect, a non-transitory computer-readable medium stores computer-executable instructions that, when executed by a location server, cause the location server to: receive, from a first network node, a measurement report including at least one positioning measurement based on a channel estimate of a positioning reference signal (PRS) transmitted by a second network node; and transmit measurement error feedback for at least the at least one positioning measurement to the first network node, wherein the measurement error feedback is based on an expected positioning measurement corresponding to the at least one positioning measurement, and wherein the expected positioning measurement is based on a location of the first network node and a location of the second network node.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
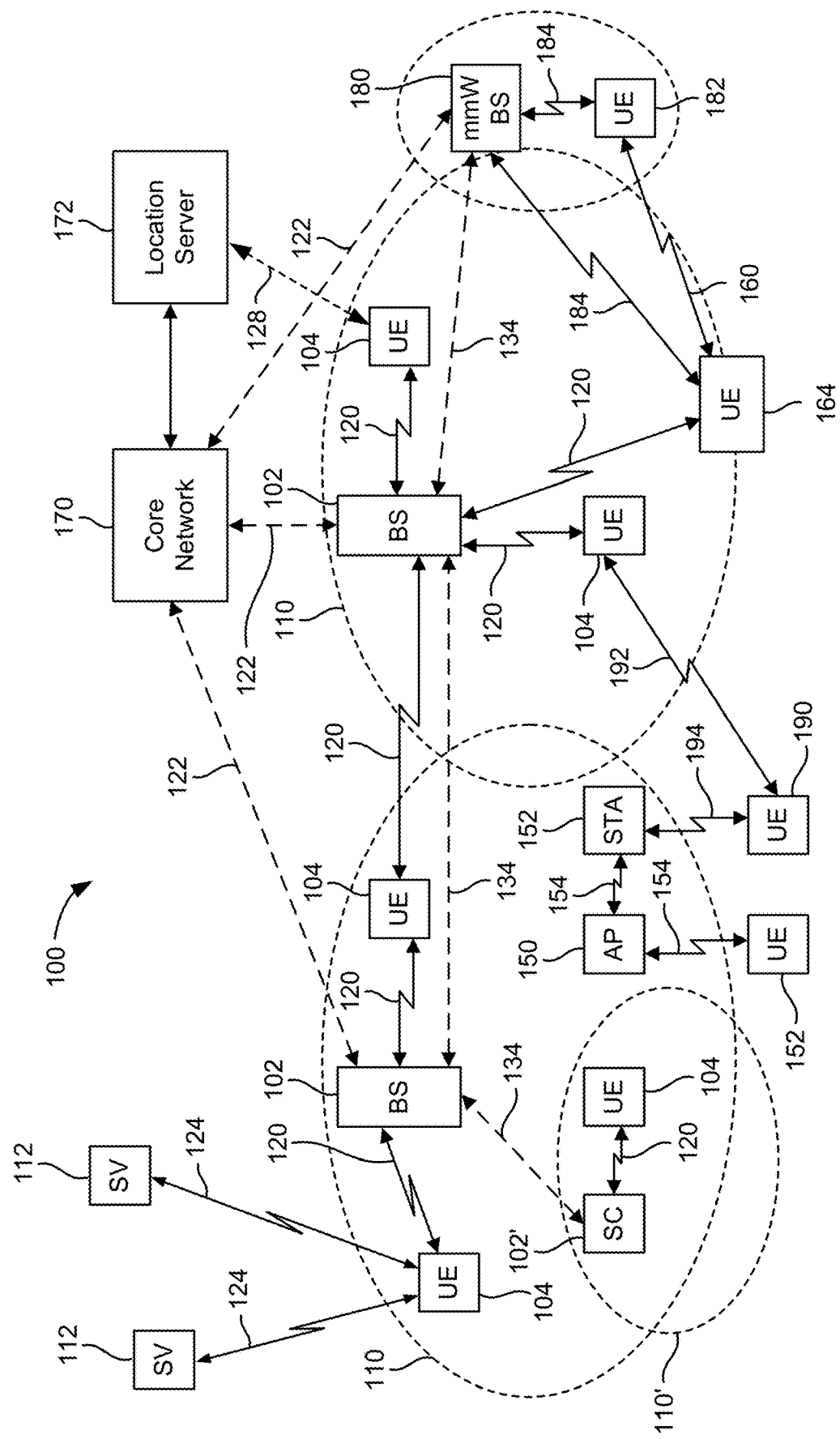
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more S Cells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
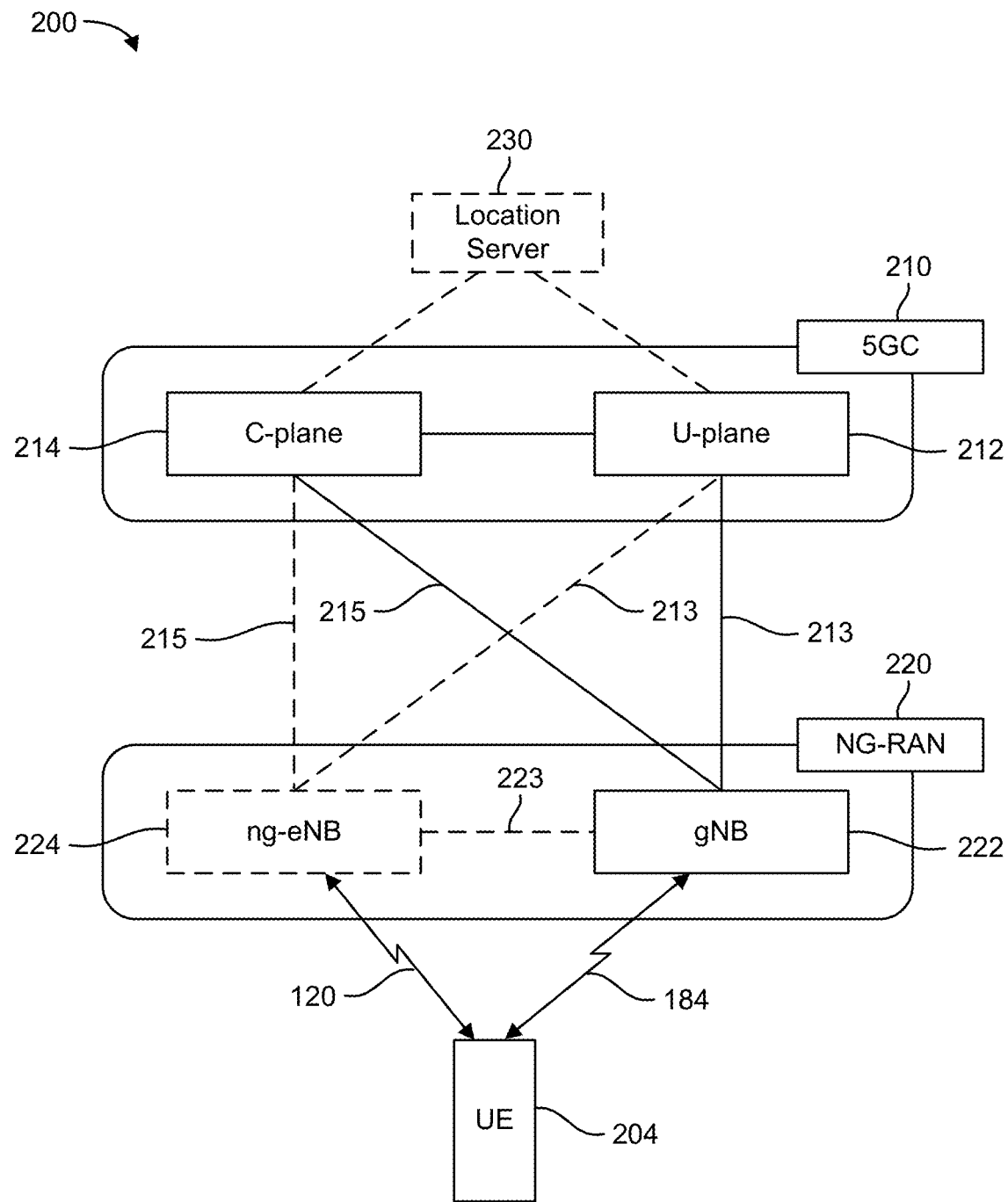
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
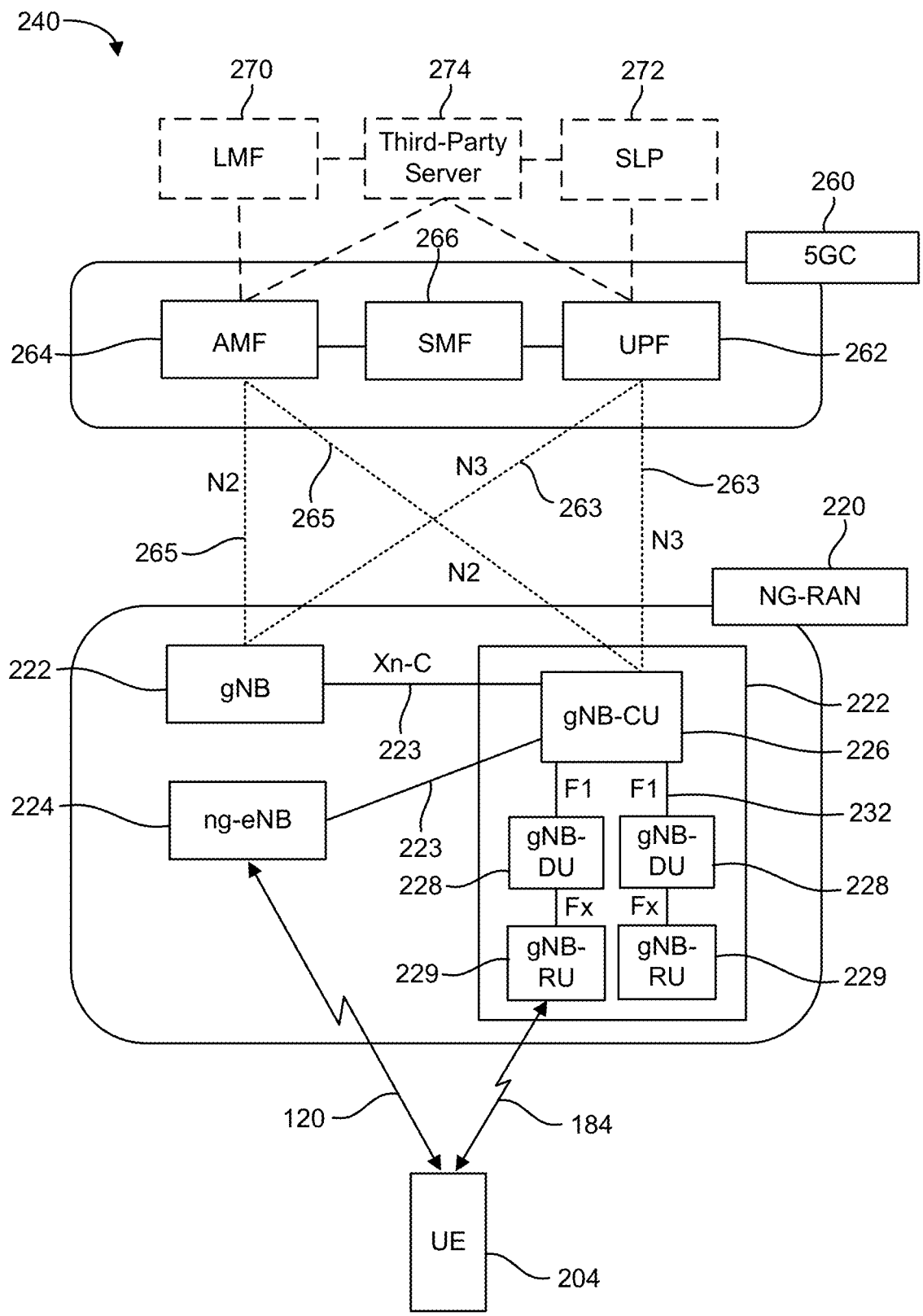

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR base station, 5G NB, access point (AP), a transmit receive point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
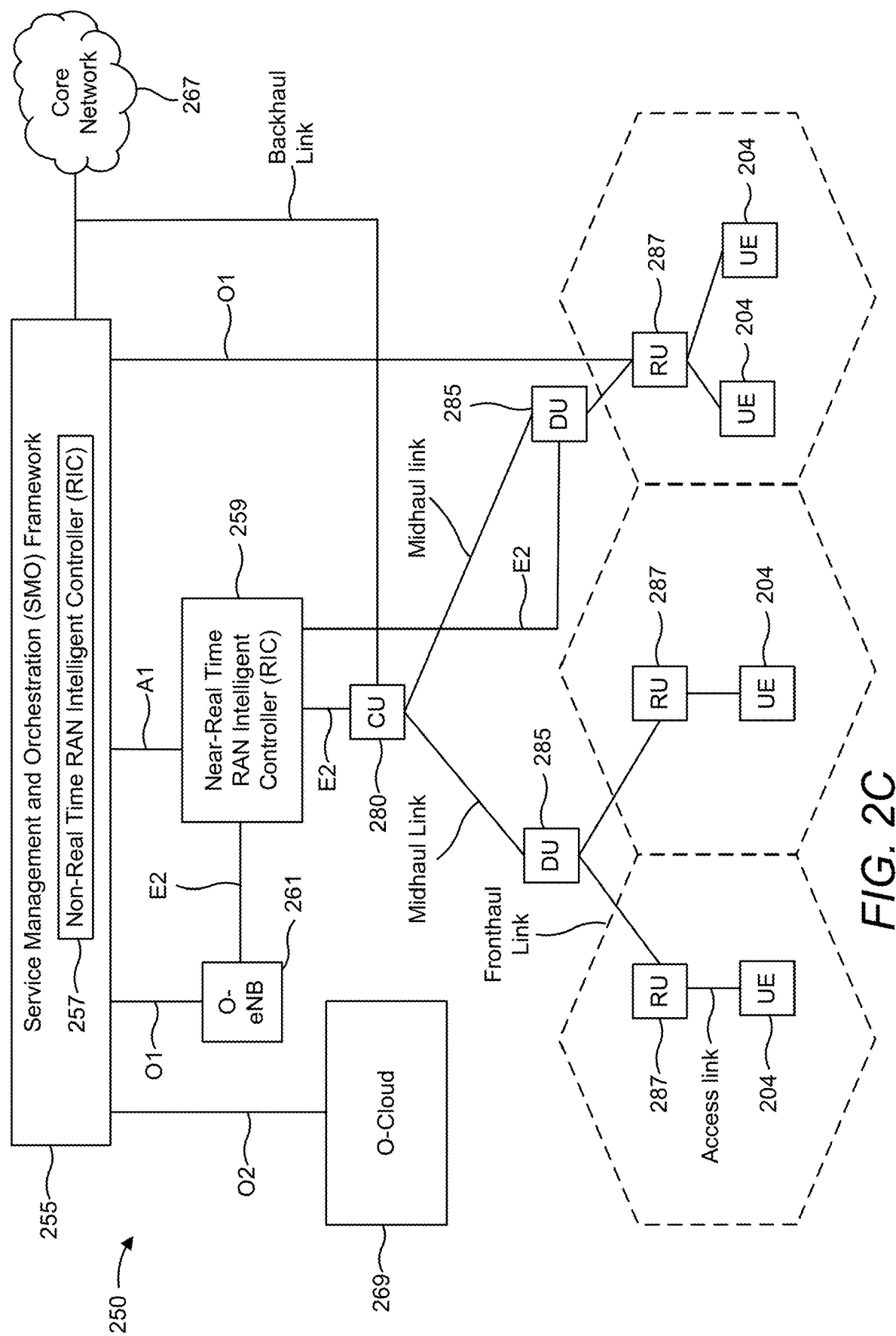

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more distributed units (DUs) 285 (e.g., gNB-DUs 228) via respective midhaul links, such as an F1 interface. The DUs 285 may communicate with one or more radio units (RUs) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUs 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 280 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 280. The CU 280 may be configured to handle user plane functionality (i.e., Central Unit-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUs 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via O1) or via creation of RAN management policies (such as A1 policies).

Figure 3A:
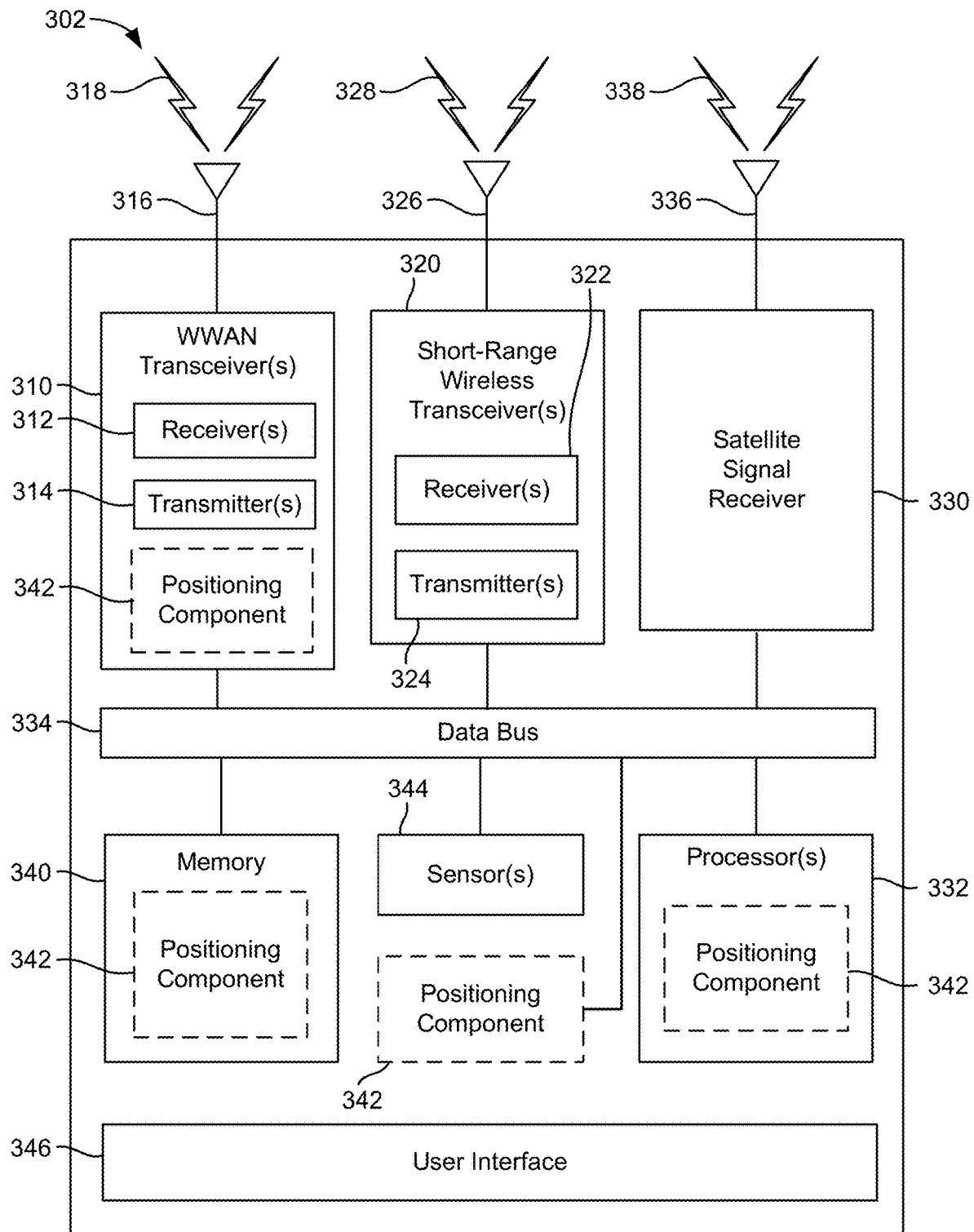
FIGS. 3A, 3B, and 3C are simplified block diagrams of several sample aspects of components that may be employed in a user equipment (UE), a base station, and a network entity, respectively, and configured to support communications as taught herein.
Figure 3B:
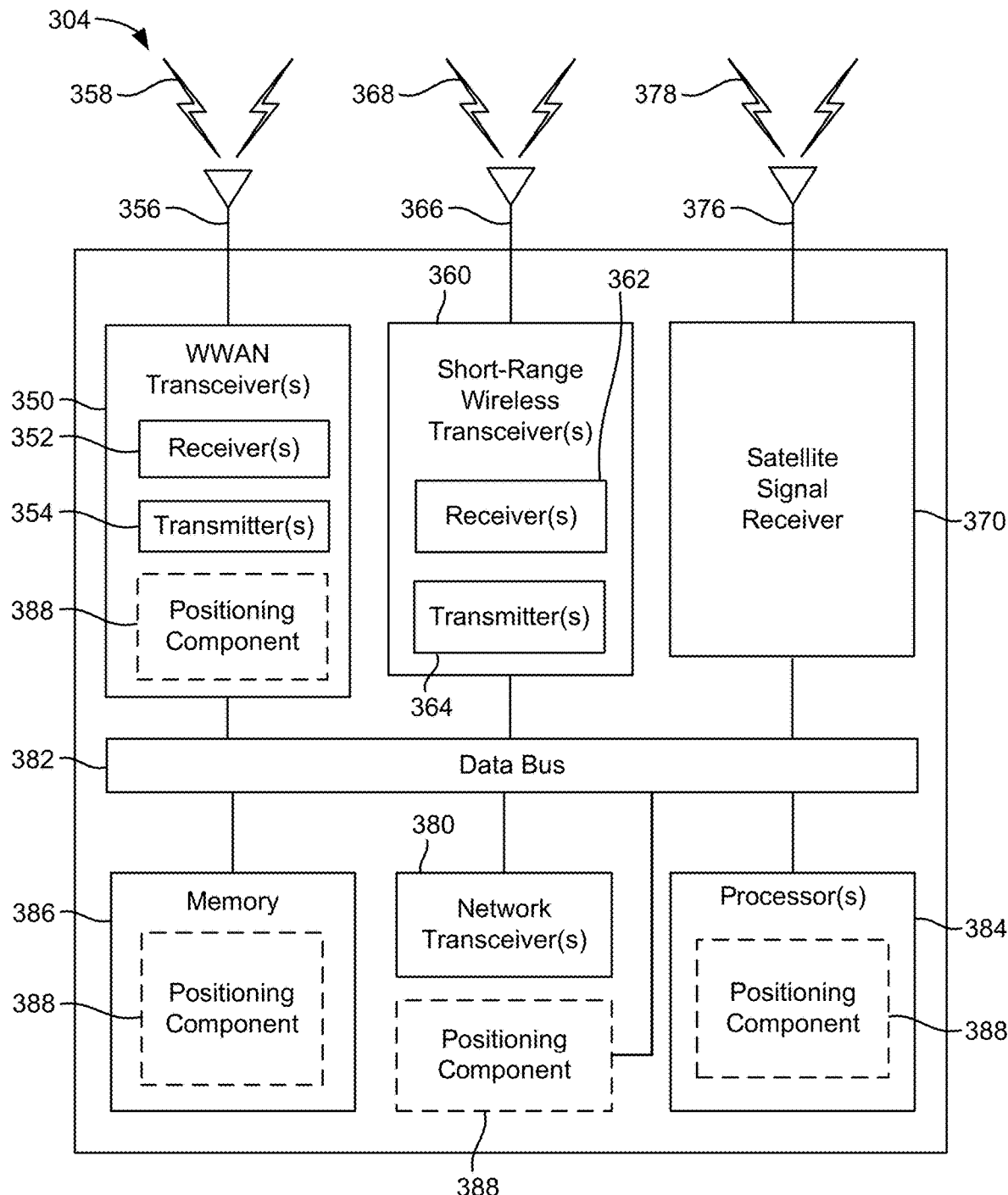
Figure 3C:
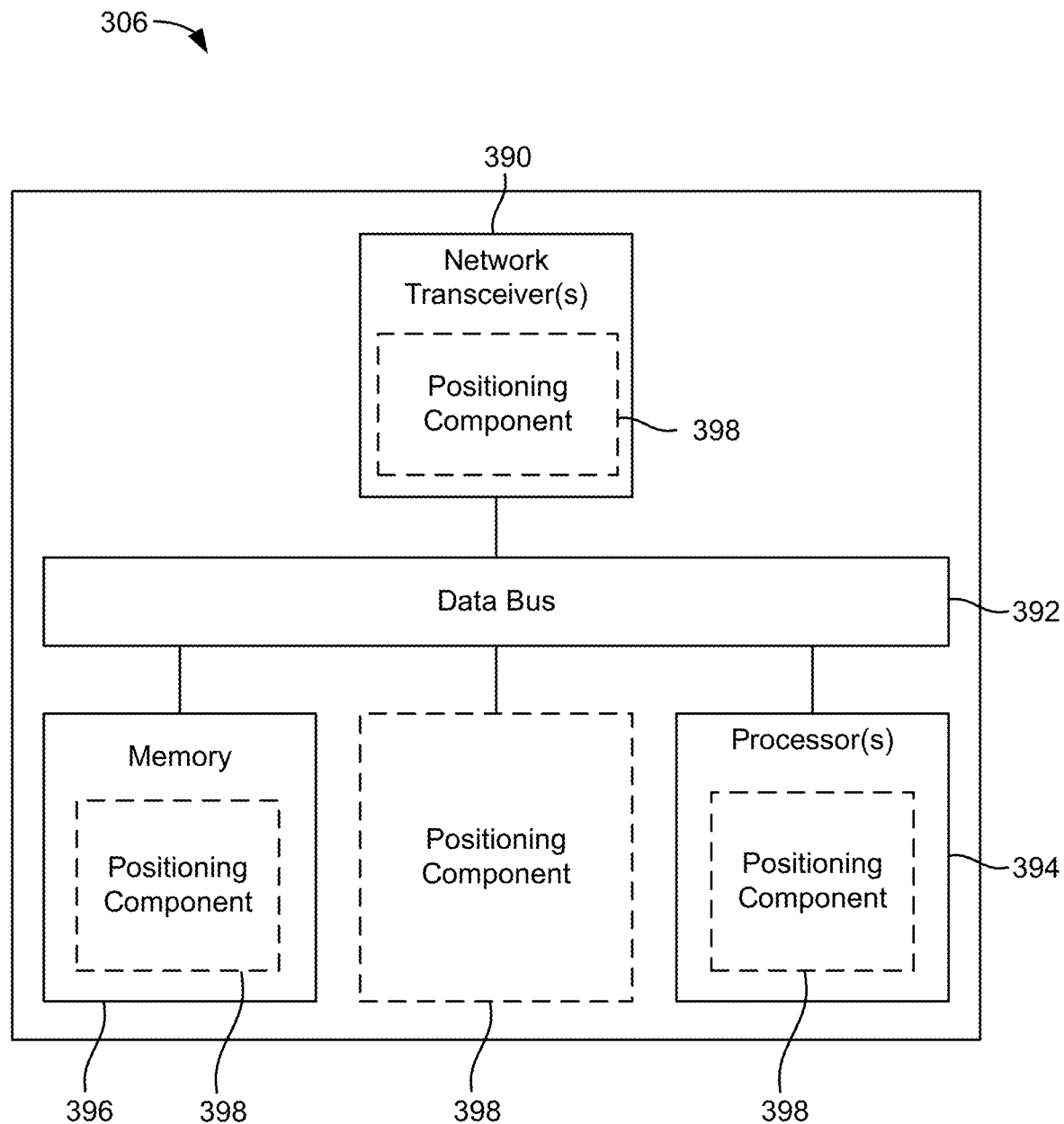

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite signal receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Application services are a pool of services, such as load balancing, application performance monitoring, application acceleration, autoscaling, micro-segmentation, service proxy, service discovery, etc., needed to optimally deploy, run, and improve applications. Services and applications are both software programs, but they generally have differing traits. Broadly, services often target smaller and more isolated functions than applications, and applications often expose and call services, including services in other applications.

Web services are a type of application service that can be accessed via a web address for direct application-to-application interaction. Web services can be local, distributed, or web-based. Web services are built on top of open standards, such as TCP/IP, HTTP, Java, HTML, and XML, and therefore, web services are not tied to any one operating system or programming language. As such, software applications written in various programming languages and running on various platforms can use web services to exchange data over computer networks like the Internet in a manner similar to inter-process communication on a single computer. For example, a client can invoke a web service by sending an XML message to the web service and waiting for a corresponding XML response.

An application programming interface (API) is an interface that facilitates interaction between different systems (e.g., hardware, firmware, and/or software entities or levels). More specifically, an API is a defined set of rules, commands, permissions, and/or protocols that allow one system to interact with, and access data from, another system. For example, an API may provide an interface for a higher level of software (e.g., an application, a web service, an application service, etc.) to access a lower level of software (e.g., a microservice, the operating system, BIOS, firmware, device drivers, etc.) or a hardware component (e.g., a USB controller, a memory controller, a transceiver, etc.). Since a web service exposes an application's data and functionality, every web service is effectively an API, but not every API is a web service.

One type of API for building microservices applications is the representational state transfer API, also known as the "REST API" or the "RESTful API." The REST API is a set of web API architecture principles, meaning that to be a REST API, the interface must adhere to certain architectural constraints. The REST API typically uses HTTP commands and secure sockets layer (SSL) encryption. It is language agnostic insofar as it can be used to connect applications and microservices written in different programming languages. The commands common to the REST API include HTTP PUT, HTTP POST, HTTP DELETE, HTTP GET, and HTTP PATCH. Developers can use these REST API commands to perform actions on different "resources" within an application or service, such as data in a database. REST APIs can use uniform resource locators (URLs) to locate and indicate the resource on which to perform an action.

Microservices are individual small, autonomous, independent services and/or functions that together form a larger microservices-based application. Within the application, each microservice performs one defined function, such as authenticating users or retrieving a particular type of data. The goal of the microservices, which are typically language-independent, is to enable them to fit into any type of application and communicate or cooperate with each other to achieve the overall purpose of the larger microservices-based application. When connecting microservices to create a microservices-based application, APIs define the rules that prevent and permit the actions of and interactions between individual microservices. For example, REST APIs may be used as the rules, commands, permissions, and/or protocols that integrate the individual microservices to function as a single application.

Webhooks enable the interaction between web-based applications using custom callbacks. The use of webhooks allows web-based applications to automatically communicate with other web-based applications. Unlike traditional systems where one system (the "subject" system) continuously polls another system (the "observer" system) for certain data, webhooks allow the observer system to push the data to the subject system automatically whenever the event occurs. This reduces a significant load on the two systems, as calls are made between the two systems only when a designated event occurs.

Webhooks communicate via HTTP and rely on the presence of static URLs that point to APIs in the subject system that should be notified when an event occurs on the observer system. Thus, the subject system needs to designate one or more URLs that will accept event notifications from the observer system.

Figure 4:
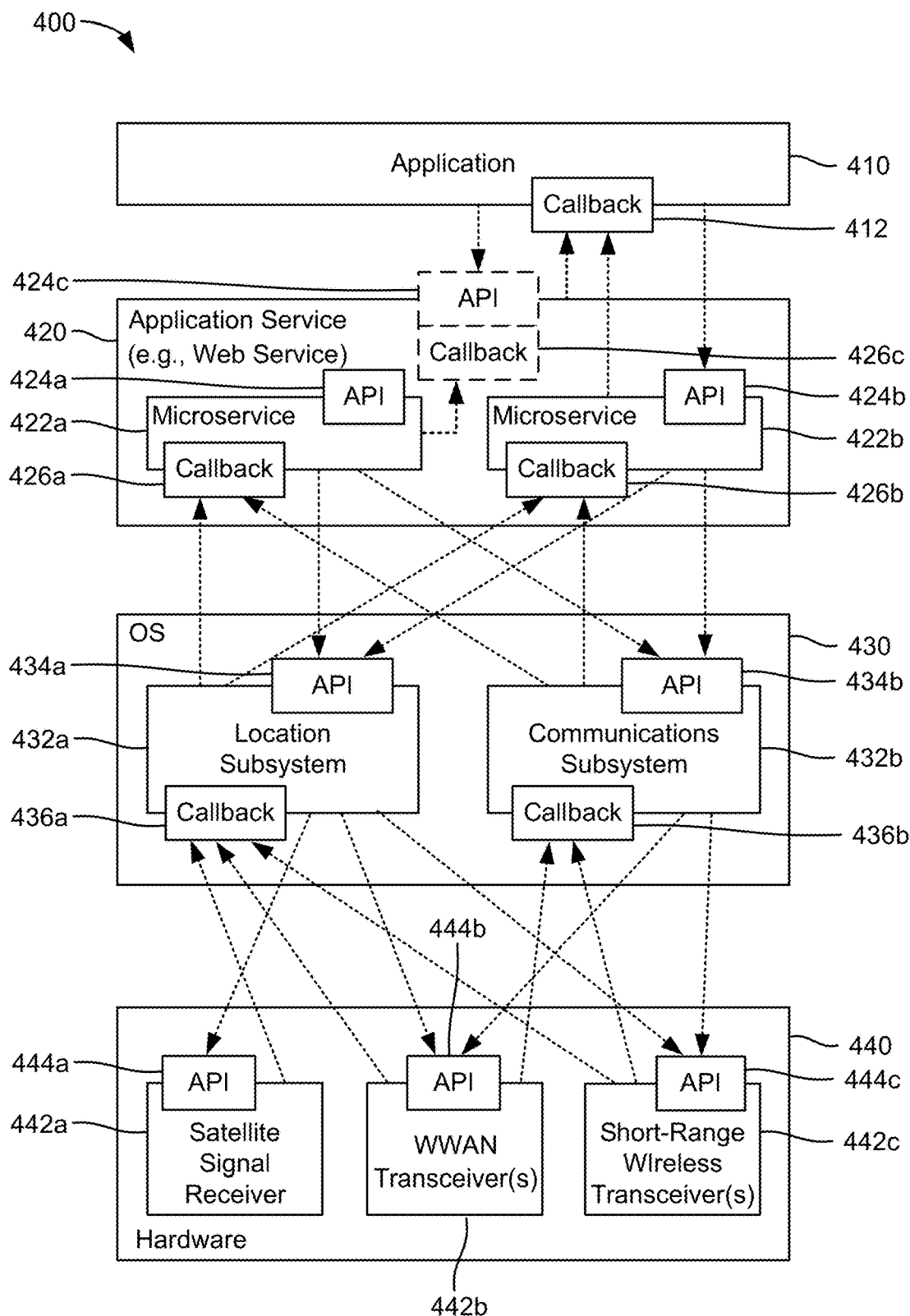
FIG. 4 is a diagram illustrating example interaction between an application, an application service, an operating system (OS), and hardware using various application programming interfaces (APIs), according to aspects of the disclosure.

FIG. 4 is a diagram 400 illustrating example interaction between an application 410, an application service 420, an operating system (OS) 430, and hardware 440 using various APIs, according to aspects of the disclosure. In an aspect, the application 410, application service 420, operating system 430, and hardware 440 may be incorporated in the same device (e.g., a UE, a base station, etc.).

As shown in FIG. 4, the application service 420 (which may be a web service) comprises two microservices 422a and 422b (collectively microservices 422). As will be appreciated, however, the application service 420 may comprise more or fewer than two microservices 422. In some cases, the application 410 may access the individual microservices 422 directly via their respective APIs 424a and 424b (collectively APIs 424). This is illustrated in FIG. 4 by application 410 invoking microservice 422b via API 424b. Alternatively, the application 410 may invoke the application service 420 via an API 424c for the application service 420. The application service 420 can then invoke the appropriate microservice(s) 422 via the respective APIs 424. This is illustrated in FIG. 4 by the application service 410 invoking microservice 422a via API 424a on behalf of the application 410.

If invoked by the application 410, the microservices 422 can respond to the application 410 via the application's 410 callback 412. Alternatively, if invoked by the application service 420, the microservice 422 can respond to the application service 420 via the application service's 420 callback 426c. In either case, the client (either the application 410 or the application service 420) may invoke the microservice(s) 422 by sending, for example, an XML message to the microservice 422 via the respective API 424, and the microservice 422 may respond to the client by sending a corresponding XML response to the callback 412.

The microservices 422 may access various subsystems within the operating system 430 via the subsystems' respective APIs. In the example of FIG. 4, the operating system 430 includes a location subsystem 432a and a communications subsystem 432b (collectively subsystems 432). The location subsystem 432a may comprise software and/or firmware for determining the location of a mobile device (e.g., a UE). The mobile device being located may be the device that includes the operating system 430 (e.g., a UE calculating its own location, as in the case of UE-based positioning) or another device that does not include the operating system 430 (e.g., where a location server estimates a UE's location). The communications subsystem 432b may similarly comprise software and/or firmware for enabling wireless communications by the device including the operating system 430. For example, the communications subsystem 432b may implement lower layer communication functionality (e.g., MAC layer functionality, RRC layer functionality, etc.).

The subsystems 432 each expose respective APIs 434a and 434b (collectively APIs 434) to the higher architecture levels. The microservices 422 may invoke the subsystems 432 via their respective APIs 434, and the subsystems 432 may respond to the microservices 422 via the microservices' 422 callbacks 426a and 426b (collectively callbacks 426). In the example of FIG. 4, the microservice 422a invokes the location subsystem 432a and the microservice 422b invokes the communications subsystem 432b within the operating system 430. As such, microservice 422a may be a location-related microservice and microservice 422b may be a communications-related microservice. However, as will be appreciated, either microservice 422 may invoke either subsystem 432 via its respective API 434.

In the example of FIG. 4, the hardware 440 includes a satellite signal receiver 442a, one or more WWAN transceivers 442b, and one or more short-range wireless transceivers 442c (collectively hardware components 442). The satellite signal receiver 442a may correspond to, for example, satellite signal receiver 330 or 370 in FIGS. 3A and 3B. The one or more WWAN transceivers 442b may correspond to, for example, the one or more WWAN transceivers 310 or 350 in FIGS. 3A and 3B. The one or more short-range wireless transceivers 442c may correspond to, for example, the one or more short-range wireless transceivers 320 or 360 in FIGS. 3A and 3B.

In the example of FIG. 4, the location subsystem 432a may send commands (e.g., requests for measurements of reference signals, requests to transmit reference signals, etc.) to the satellite signal receiver 442a, the one or more WWAN transceivers 442b, and/or the one or more short-range wireless transceivers 442c via their APIs 444a, 444b, and 444c, respectively. The satellite signal receiver 442a, the one or more WWAN transceivers 442b, and/or the one or more short-range wireless transceivers 442c may send responses (e.g., measurements of reference signals, acknowledgments, etc.) to the commands to the location subsystem 432a via callback 436a. Similarly, the communications subsystem 432b may send information to be transmitted wirelessly (e.g., user data, measurement reports, etc.) to the one or more WWAN transceivers 442b and/or the one or more short-range wireless transceivers 442c via their APIs 444b and 444c, respectively. The one or more WWAN transceivers 442b and/or the one or more short-range wireless transceivers 442c may send information received wirelessly (e.g., user data, location requests, positioning assistance data, etc.) to the communications subsystem 432b via callback 436b.

As a specific positioning example in the context of FIG. 4, the device incorporating the illustrated architecture may be a mobile device, and the application 410 may be an application that uses the location of the mobile device (e.g., a UE), such as a navigation application (e.g., running locally on the mobile device). The application 410 therefore invokes application service 420 (via API 424c), which invokes microservice 422a (via API 424a), or invokes microservice 422a directly (via API 424a). The command from the application 410 indicates that the application 420 is requesting the location of the mobile device, and may include (or additional commands may include) other information related to the requested location fix, such as the requested quality of service (QoS) (e.g., accuracy and latency).

Based on the QoS of the location request, the known capabilities of the mobile device (e.g., available positioning technologies, such as satellite-based, NR-based, Wi-Fi-based, etc.), the available reference signal configurations (e.g., from nearby base stations), and the like, the microservice 422a calls the location subsystem 432a (via API 434a). Note that the microservice 422a may coordinate with other microservices, other application services, other applications, and the like to obtain the information necessary to locate the mobile device. For example, the microservice 422a may need to access another microservice associated with one or more base stations the mobile device is expected to measure in order to perform an NR-based positioning procedure.

The microservice 422a may select the positioning technology to use to obtain the location of the mobile device based on the known capabilities of the mobile device and the requested QoS. For example, using the satellite signal receiver 442a may provide high accuracy and low latency but it may be turned off. As another example, using the one or more WWAN transceivers 442b may provide low latency, but if the mobile device is indoors, the accuracy may be poor. Based on the selected positioning technology, the microservice 422a sends one or more commands to the location subsystem 432a requesting the location subsystem 432a to invoke the satellite signal receiver 442a, the one or more WWAN transceivers 442b, or the one or more short-range wireless transceivers 442c. Also depending on the type of positioning technology selected, the microservice 422a may provide commands regarding which reference signals to measure, which reference signals to transmit, and the like. In addition, the microservice 422a may indicate the accuracy and latency needed for the positioning measurements.

Based on the commands from the microservice 422a, the location subsystem 432a invokes the appropriate hardware component(s) (via one or more of APIs 444). For example, if the positioning technology is NR-based, the location subsystem 432a may transmit commands to the one or more WWAN transceivers 442b to measure and/or transmit certain reference signals at certain times and on certain frequencies. In addition, based on the requested accuracy and latency, the location subsystem 432a may increase or decrease the amount of power and/or processing resources allocated to the one or more WWAN transceivers 442b. For example, for a higher accuracy requirement, the location subsystem 432a may dedicate more power and/or processing resources to the one or more WWAN transceivers 442b.

The location subsystem 432a receives (via callback 436a) positioning measurements (e.g., reception times, transmission times, signal strengths, etc.) from the one or more WWAN transceivers 442b and passes them to the microservice 422a (via callback 426a). The microservice 422a can then calculate the location of the mobile device based on the measurements and any other available information (e.g., the location(s) of the base station(s) transmitting the measured reference signals). The microservice 422a provides the calculated location of the mobile device to the application 410 via callback 412 or via application service 420 (depending on which entity invoked the microservice 422a).

In certain aspects, the application 410 may provide credentials or other authorization to the microservice 422a indicating that the application 410 is permitted to access the location of the mobile device. Alternatively, upon receiving the request from the application 410, the microservice 422*a* may determine whether the application 410 is authorized. This check may be performed via another microservice, for example, or by invoking the operating system 430 to determine whether the application 410 has permission to access the mobile device's location. Similarly, the microservice 422*a* may need to provide credentials or other authorization to the operating system 430 to indicate that the microservice 422*a* is permitted to access the location of the mobile device. Alternatively, upon receiving the request from the microservice 422*a*, the operating system 430 may determine whether the microservice 422*a* is authorized.

In certain aspects, the application 410 may use a webhook to obtain the location of the mobile device. In that way, the application 410 will be informed whenever the mobile device moves from one location to another. In this case, the observer system would be the microservice 422*a* and the subject system would be the application 410. Instead of the application 410 having to periodically call the microsystem 422*a* to check whether the mobile device's location has changed, a webhook created in the application 410 would allow the microservice 422*a* to push any change in the mobile device's location to the application 410 automatically through a registered URL. The microservice 422*a* may periodically perform positioning operations to determine the location of the mobile device in order to report changes to the application 410.

Similarly, the microservice 422*a* may use a webhook to obtain changes in the location of the mobile device. In this case, however, because the microservice 422*a* coordinates location determinations for certain types of positioning technologies (e.g., NR-based, Wi-Fi-based), the webhook may only apply to certain other types of positioning technologies (e.g., satellite-based, sensor-based). For example, if the location subsystem 432*a* coordinates satellite-based positioning via the satellite signal receiver 442*a*, it can report any detected change in location to the microservice 422*a* via the webhook.

In some cases, the application 410, the application service 420, the operating system 430, and the hardware 440 may be distributed across multiple devices (e.g., a UE, a web sever, a location server, etc.). For example, the application 410 may be running on a location server (e.g., LMF 270), the application service 420 may be running on a web server, and the operating system 430 and hardware 440 may be incorporated in a UE (e.g., UE 204).

Figure 5:
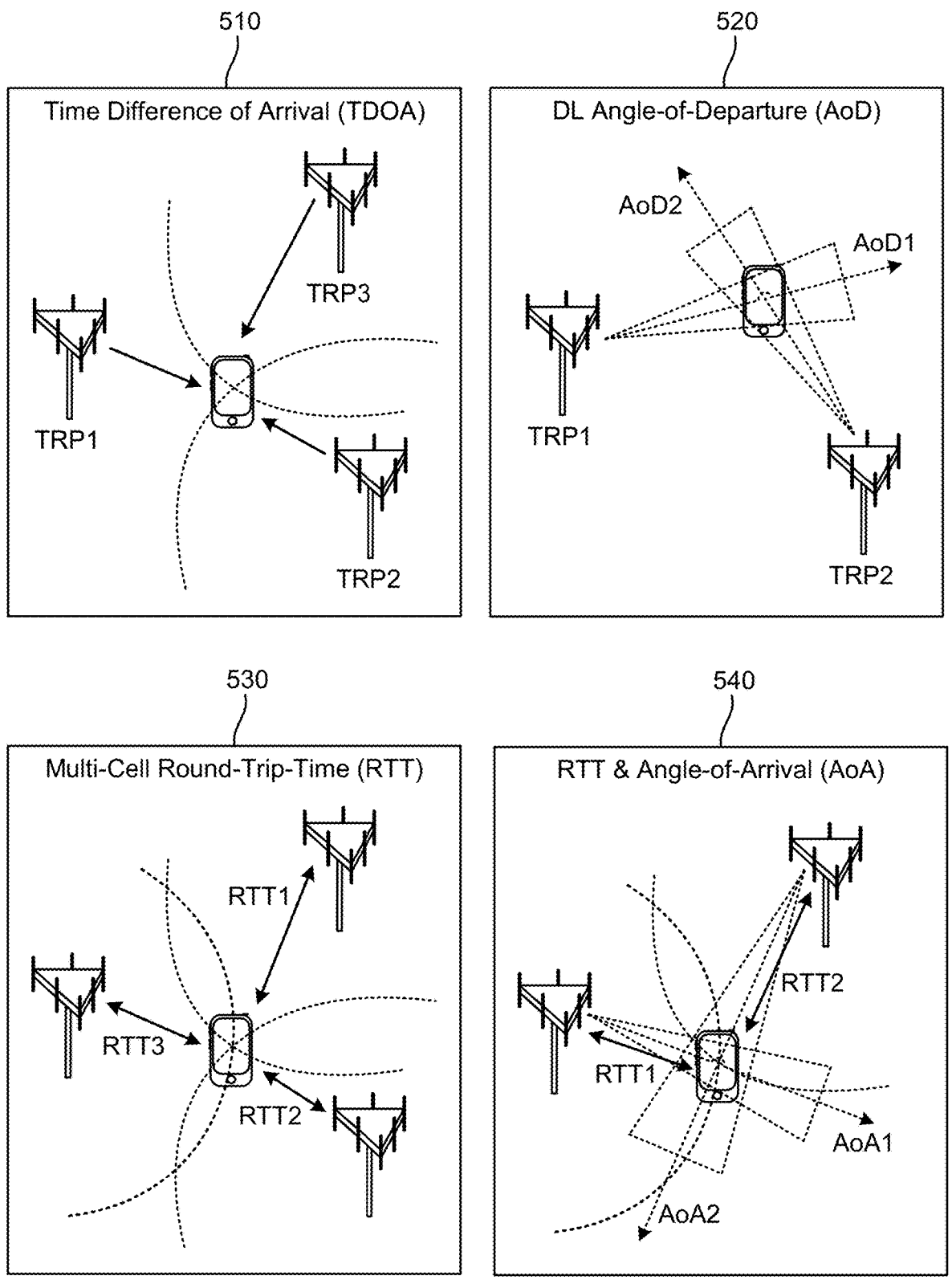
FIG. 5 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 5 illustrates examples of various positioning methods, according to aspects of the disclosure. In an OTDOA or DL-TDOA positioning procedure, illustrated by scenario 510, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 520, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA)) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 530, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 540.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, for UE-assisted positioning, the assistance data may include identifiers of the base stations (or the cells/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. For UE-based positioning, the assistance data may additionally include a base station almanac (BSA) that includes the locations of the involved base stations. Alternatively, the assistance data may originate directly from the base stations themselves (e.g., in periodically broadcasted overhead messages, etc.). In some cases, the UE may be able to detect neighbor base stations itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (µs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 6:
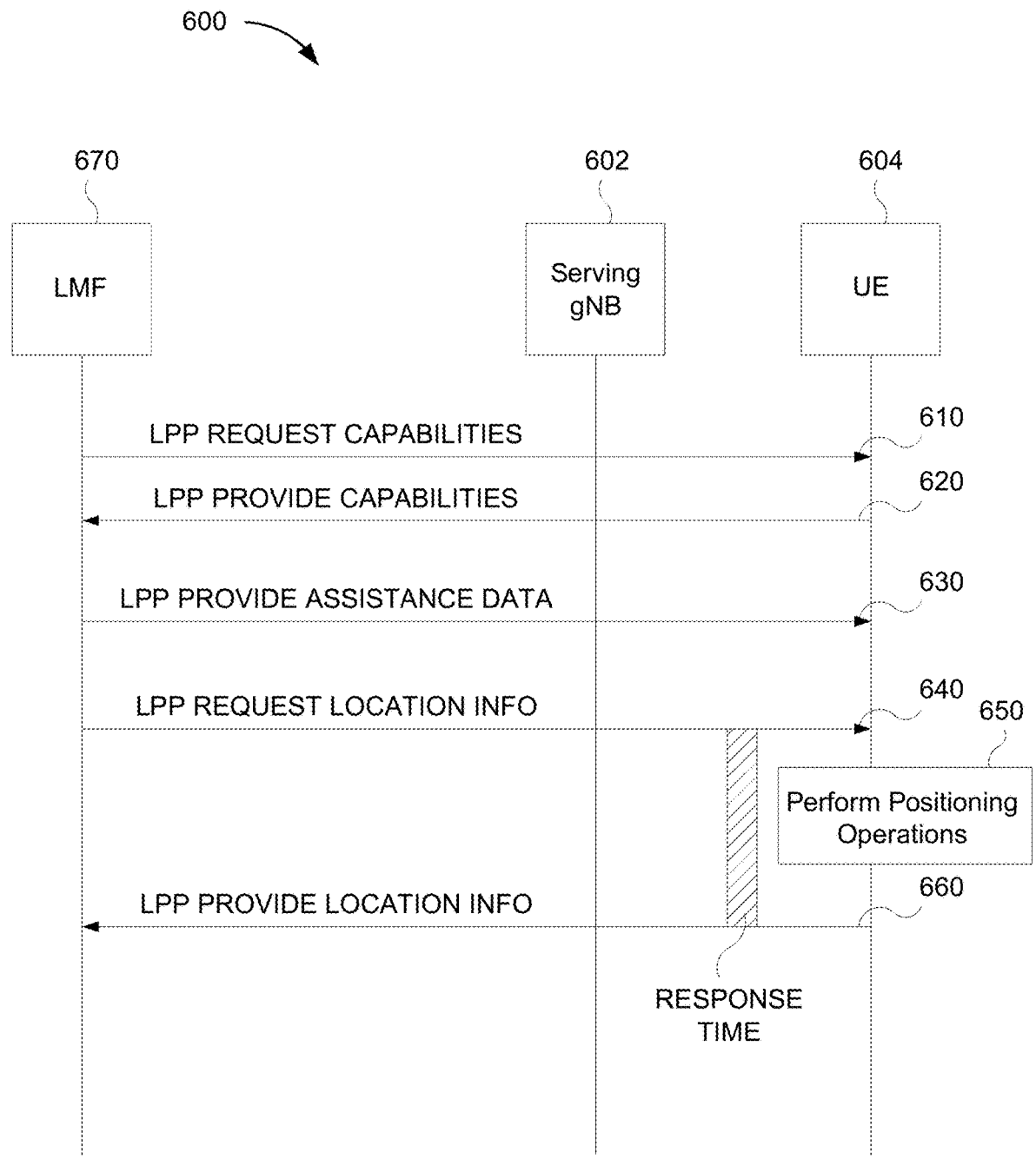
FIG. 6 illustrates an example Long-Term Evolution (LTE) positioning protocol (LPP) call flow between a UE and a location server for performing positioning operations.

FIG. 6 illustrates an example Long-Term Evolution (LTE) positioning protocol (LPP) procedure 600 between a UE 604 and a location server (illustrated as a location management function (LMF) 670) for performing positioning operations. As illustrated in FIG. 6, positioning of the UE 604 is supported via an exchange of LPP messages between the UE 604 and the LMF 670. The LPP messages may be exchanged between UE 604 and the LMF 670 via the UE's 604 serving base station (illustrated as a serving gNB 602) and a core network (not shown). The LPP procedure 600 may be used to position the UE 604 in order to support various location-related services, such as navigation for UE 604 (or for the user of UE 604), or for routing, or for provision of an accurate location to a public safety answering point (PSAP) in association with an emergency call from UE 604 to a PSAP, or for some other reason. The LPP procedure 600 may also be referred to as a positioning session, and there may be multiple positioning sessions for different types of positioning methods (e.g., downlink time difference of arrival (DL-TDOA), round-trip-time (RTT), enhanced cell identity (E-CID), etc.).

Initially, the UE 604 may receive a request for its positioning capabilities from the LMF 670 at stage 610 (e.g., an LPP Request Capabilities message). At stage 620, the UE 604 provides its positioning capabilities to the LMF 670 relative to the LPP protocol by sending an LPP Provide Capabilities message to LMF 670 indicating the position methods and features of these position methods that are supported by the UE 604 using LPP. The capabilities indicated in the LPP Provide Capabilities message may, in some aspects, indicate the type of positioning the UE 604 supports (e.g., DL-TDOA, RTT, E-CID, etc.) and may indicate the capabilities of the UE 604 to support those types of positioning.

Upon reception of the LPP Provide Capabilities message, at stage 620, the LMF 670 determines to use a particular type of positioning method (e.g., DL-TDOA, RTT, E-CID, etc.) based on the indicated type(s) of positioning the UE 604 supports and determines a set of one or more transmission-reception points (TRPs) from which the UE 604 is to measure downlink positioning reference signals or towards which the UE 604 is to transmit uplink positioning reference signals. At stage 630, the LMF 670 sends an LPP Provide Assistance Data message to the UE 604 identifying the set of TRPs.

In some implementations, the LPP Provide Assistance Data message at stage 630 may be sent by the LMF 670 to the UE 604 in response to an LPP Request Assistance Data message sent by the UE 604 to the LMF 670 (not shown in FIG. 6). An LPP Request Assistance Data message may include an identifier of the UE's 604 serving TRP and a request for the positioning reference signal (PRS) configuration of neighboring TRPs.

At stage 640, the LMF 670 sends a request for location information to the UE 604. The request may be an LPP Request Location Information message. This message usually includes information elements defining the location information type, desired accuracy of the location estimate, and response time (i.e., desired latency). Note that a low latency requirement allows for a longer response time while a high latency requirement requires a shorter response time. However, a long response time is referred to as high latency and a short response time is referred to as low latency.

Note that in some implementations, the LPP Provide Assistance Data message sent at stage 630 may be sent after the LPP Request Location Information message at 640 if, for example, the UE 604 sends a request for assistance data to LMF 670 (e.g., in an LPP Request Assistance Data message, not shown in FIG. 6) after receiving the request for location information at stage 640.

At stage 650, the UE 604 utilizes the assistance information received at stage 630 and any additional data (e.g., a desired location accuracy or a maximum response time) received at stage 640 to perform positioning operations (e.g., measurements of DL-PRS, transmission of UL-PRS, etc.) for the selected positioning method.

At stage 660, the UE 604 may send an LPP Provide Location Information message to the LMF 670 conveying the results of any measurements that were obtained at stage 650 (e.g., time of arrival (ToA), reference signal time difference (RSTD), reception-to-transmission (Rx-Tx), etc.) and before or when any maximum response time has expired (e.g., a maximum response time provided by the LMF 670 at stage 640). The LPP Provide Location Information message at stage 660 may also include the time (or times) at which the positioning measurements were obtained and the identity of the TRP(s) from which the positioning measurements were obtained. Note that the time between the request for location information at 640 and the response at 660 is the "response time" and indicates the latency of the positioning session.

The LMF 670 computes an estimated location of the UE 604 using the appropriate positioning techniques (e.g., DL-TDOA, RTT, E-CID, etc.) based, at least in part, on measurements received in the LPP Provide Location Information message at stage 660.

Figure 7:
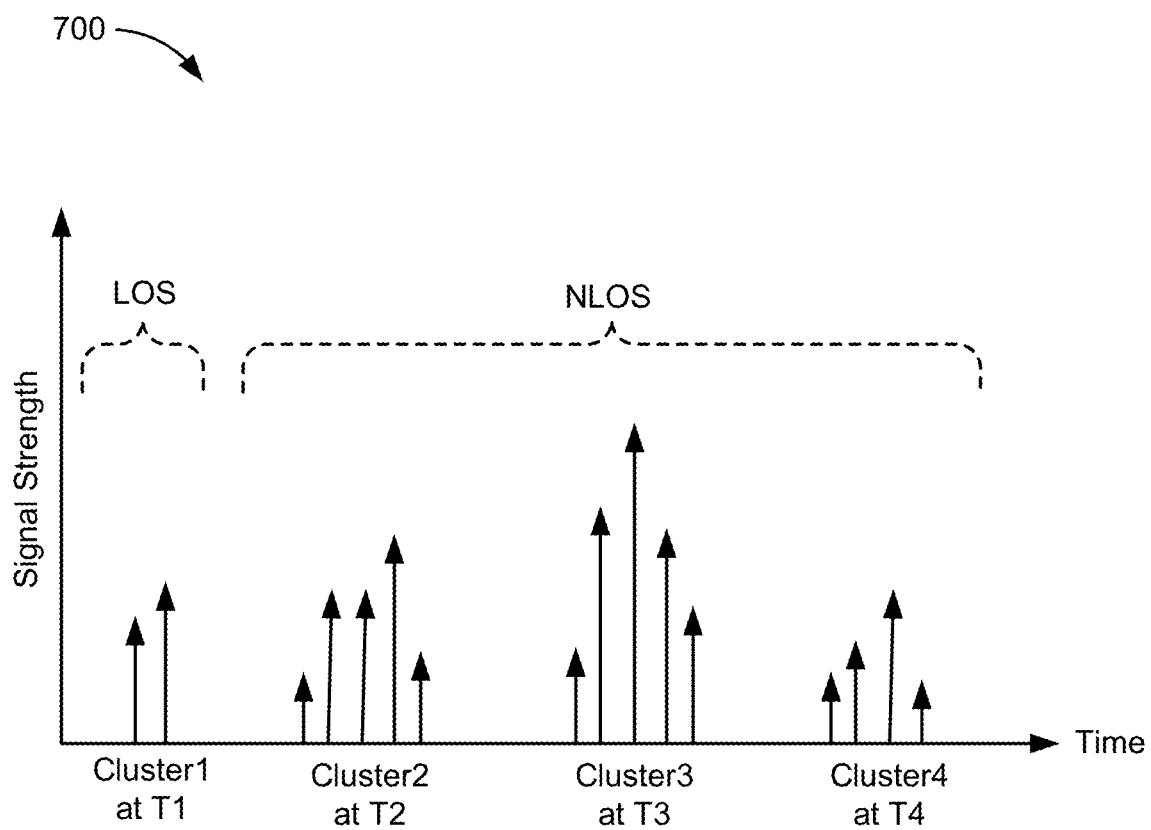
FIG. 7 is a graph representing an example radio frequency (RF) channel estimate, according to aspects of the disclosure.

FIG. 7 is a graph 700 representing an example channel estimate of a multipath channel between a receiver device (e.g., any of the UEs or base stations described herein) and a transmitter device (e.g., any other of the UEs or base stations described herein), according to aspects of the disclosure. The channel estimate represents the intensity of a radio frequency (RF) signal (e.g., a PRS) received through a multipath channel as a function of time delay, and may be referred to as the channel energy response, channel impulse response, or power delay profile of the channel. Thus, the horizontal axis is in units of time (e.g., milliseconds) and the vertical axis is in units of signal strength (e.g., decibels). Note that a multipath channel is a channel between a transmitter and a receiver over which an RF signal follows multiple paths, or multipaths, due to transmission of the RF signal on multiple beams and/or to the propagation characteristics of the RF signal (e.g., reflection, refraction, etc.).

In the example of FIG. 7, the receiver detects/measures multiple (four) clusters of channel taps. Each channel tap represents a multipath that an RF signal followed between the transmitter and the receiver. That is, a channel tap represents the arrival of an RF signal on a multipath. Each cluster of channel taps indicates that the corresponding multipaths followed essentially the same path. There may be different clusters due to the RF signal being transmitted on different transmit beams (and therefore at different angles), or because of the propagation characteristics of RF signals (e.g., potentially following different paths due to reflections), or both.

All of the clusters of channel taps for a given RF signal represent the multipath channel (or simply channel) between the transmitter and receiver. Under the channel illustrated in FIG. 7, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 7, because the first cluster of RF signals at time T1 arrives first, it is assumed to correspond to the RF signal transmitted on the transmit beam aligned with the line-of-sight (LOS), or the shortest, path. The third cluster at time T3 is comprised of the strongest RF signals, and may correspond to, for example, the RF signal transmitted on a transmit beam aligned with a non-line-of-sight (NLOS) path. Note that although FIG. 7 illustrates clusters of two to five channel taps, as will be appreciated, the clusters may have more or fewer than the illustrated number of channel taps.

Machine learning may be used to generate models that may be used to improve the performance of various techniques used for the air-interface. One potential application of machine learning is to improve the accuracy of the measurements of positioning reference signals (e.g., PRS) reported for the purpose of positioning.

Machine learning models are generally categorized as either supervised or unsupervised. Supervised learning involves learning a function that maps one or more inputs to one or more outputs (labels) based on example input-output pairs. Training a machine learning model requires the collection of training data that is representative of the scenarios of interest. For example, given a training dataset with two variables of age (input) and height (output), a supervised learning model could be generated to predict the height of a person (the desired label or classification) based on their age (the input). In regression models, the output is continuous. One example of a regression model is a linear regression, which simply attempts to find a line that best fits the data. Extensions of linear regression include multiple linear regression (e.g., finding a plane of best fit) and polynomial regression (e.g., finding a curve of best fit).

Another example of a machine learning model is a decision tree model. In a decision tree model, a tree structure is defined with a plurality of nodes. Decisions are used to move from a root node at the top of the decision tree to a leaf node at the bottom of the decision tree (i.e., a node with no further child nodes). Generally, a higher number of nodes in the decision tree model is correlated with higher decision accuracy.

Another example of a machine learning model is a decision forest. Random forests are an ensemble learning technique that builds off of decision trees. Random forests involve creating multiple decision trees using bootstrapped datasets of the original data and randomly selecting a subset of variables at each step of the decision tree. The model then selects the mode of all of the predictions of each decision tree. By relying on a "majority wins" model, the risk of error from an individual tree is reduced.

Another example of a machine learning model is a neural network (NN). A neural network is essentially a network of mathematical equations. Neural networks accept one or more input variables, and by going through a network of equations, result in one or more output variables. Put another way, a neural network takes in a vector of inputs and returns a vector of outputs.

Figure 8:
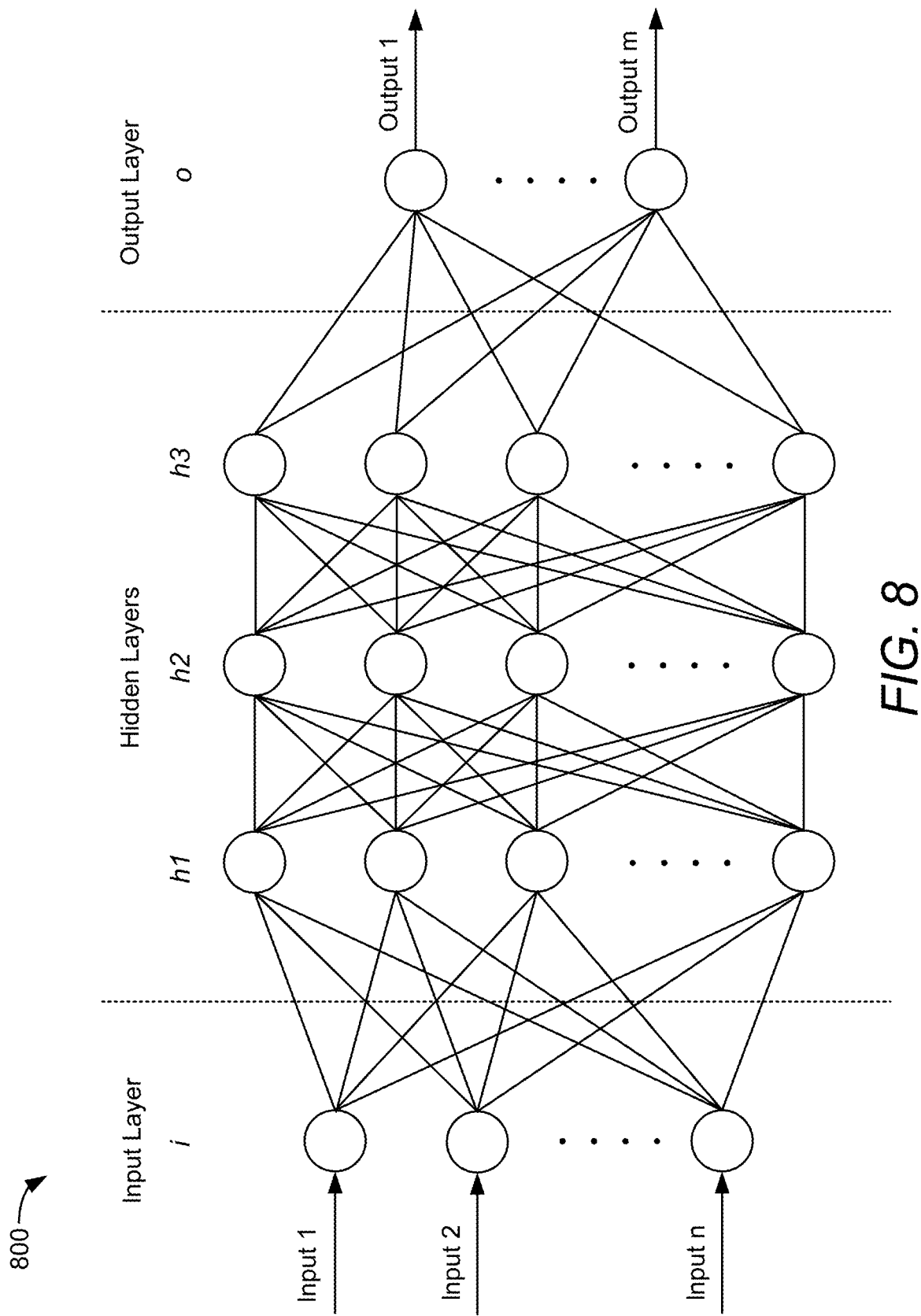
FIG. 8 illustrates an example neural network, according to aspects of the disclosure.

FIG. 8 illustrates an example neural network 800, according to aspects of the disclosure. The neural network 800 includes an input layer T that receives 'n' (one or more) inputs (illustrated as "Input 1," "Input 2," and "Input n"), one or more hidden layers (illustrated as hidden layers 'h1,' 'h2,' and 'h3') for processing the inputs from the input layer, and an output layer 'o' that provides 'm' (one or more) outputs (labeled "Output 1" and "Output m"). The number of inputs 'n,' hidden layers 'h,' and outputs 'm' may be the same or different. In some designs, the hidden layers 'h' may include linear function(s) and/or activation function(s) that the nodes (illustrated as circles) of each successive hidden layer process from the nodes of the previous hidden layer.

In classification models, the output is discrete. One example of a classification model is logistic regression. Logistic regression is similar to linear regression but is used to model the probability of a finite number of outcomes, typically two. In essence, a logistic equation is created in such a way that the output values can only be between '0' and '1.' Another example of a classification model is a support vector machine. For example, for two classes of data, a support vector machine will find a hyperplane or a boundary between the two classes of data that maximizes the margin between the two classes. There are many planes that can separate the two classes, but only one plane can maximize the margin or distance between the classes. Another example of a classification model is Naïve Bayes, which is based on Bayes Theorem. Other examples of classification models include decision tree, random forest, and neural network, similar to the examples described above except that the output is discrete rather than continuous.

Unlike supervised learning, unsupervised learning is used to draw inferences and find patterns from input data without references to labeled outcomes. Two examples of unsupervised learning models include clustering and dimensionality reduction.

Clustering is an unsupervised technique that involves the grouping, or clustering, of data points. Clustering is frequently used for customer segmentation, fraud detection, and document classification. Common clustering techniques include k-means clustering, hierarchical clustering, mean shift clustering, and density-based clustering. Dimensionality reduction is the process of reducing the number of random variables under consideration by obtaining a set of principal variables. In simpler terms, dimensionality reduction is the process of reducing the dimension of a feature set (in even simpler terms, reducing the number of features). Most dimensionality reduction techniques can be categorized as either feature elimination or feature extraction. One example of dimensionality reduction is called principal component analysis (PCA). In the simplest sense, PCA involves project higher dimensional data (e.g., three dimensions) to a smaller space (e.g., two dimensions). This results in a lower dimension of data (e.g., two dimensions instead of three dimensions) while keeping all original variables in the model.

Regardless of which machine learning model is used, at a high-level, a machine learning module (e.g., implemented by a processing system, such as processors 332, 384, or 394) may be configured to iteratively analyze training input data (e.g., measurements of reference signals to/from various target UEs) and to associate this training input data with a reference output data set (e.g., a set of possible or likely candidate locations of the various target UEs), thereby enabling later determination (inference) of the same output data set when presented with similar input data (e.g., from other target UEs at the same or similar location).

Consider the scenario of training a machine learning model to estimate the RSTD measurement of a pair of TRPs from the respective PRS channel estimates (i.e., the channel estimates of PRS). The reference (or expected) output for training such a model would be the correct RSTD measurement for the given location of the UE. For a UE-assisted positioning scenario, where the UE reports the RSTD measurements and the location server estimates the location of the UE, because the location computation is performed on the network side, the BSA is not conveyed to the UE. Since the UE is unaware of the locations of the measured TRPs, it may not be able to compute the "correct" RSTD for a pair of TRPs.

More specifically, based on the estimated location of the UE determined from multiple reported RSTD measurements (and any other measurements reported by the UE) and the known locations of the involved (measured) TRPs, the location server can determine the RSTD that would be expected for a specific pair of TRPs. The location server can then determine whether the RSTD measurement reported by the UE for that pair of TRPs is "correct." That is, the location server can determine whether the reported RSTD for that pair of TRPs is consistent with (e.g., within a threshold of) the expected RSTD for that pair of TRPs.

Similarly, for uplink-based or downlink-and-uplink-based positioning methods, it may be beneficial for the involved TRPs to know the correct value of an uplink measurement to use as a reference output for machine learning training. However, the involved TRPs may not be aware of each other's location or the estimated location of the UE.

In some cases, the network (e.g., location server) may provide measurement correction information to a UE. However, such correction information is based on previous measurements made by one or more reference devices at other known locations, and is not specifically related to the actual channel measurements made by the UE under consideration. It would be beneficial to leverage machine learning to provide error feedback specific to the measurements made by a UE. For machine learning training, the UE needs to know the reference (expected) output that directly corresponds to the inputted PRS channel measurements that the UE used to determine a specific positioning measurement (e.g., an RSTD measurement).

The present disclosure provides techniques for conveying measurement error feedback to enable machine learning-based positioning. Based on the estimated location of the UE and the known locations of the involved (measured) TRPs, the location server can provide the UE a measurement error feedback message. This message may convey (1) the error of (i.e., the difference between) a prior reported measurement relative to the value of the measurement that is consistent with the estimated location of the UE, (2) a "corrected" (or expected) measurement value that is consistent with the estimated location of the UE, and/or (3) a correction term to be applied to a prior reported measurement to make it consistent with the estimated location of the UE. The message may also include a confidence level associated with the error feedback (e.g., a confidence in the accuracy of the expected positioning measurement). Since the measurement error feedback message is received after the UE provides the measurement report for the positioning session, the message may be associated with the prior measurement report using an identifier or a timestamp of the measurement report.

In an aspect, where the measurement error feedback message is for one or more RSTD measurements for a TDOA-based positioning procedure, and the UE provided a multipath RSTD report (e.g., in an LPP Provide Location Information message, as at stage 660 of FIG. 6), the feedback message may indicate which of the reported paths is most consistent with the estimated location of the UE. That is, a UE may report an RSTD measurement for each of multiple paths, and the location server may indicate which of those measured paths was most consistent with the estimated location of the UE. In another aspect, where the measurement error feedback message is for a DL-AoD positioning procedure, the message may be the expected DL-AOD value based on the estimated location of the UE.

Upon receipt of a measurement error feedback message, the UE can use the information in the message to derive a reference output associated with the channel estimate(s) used to derive the measurement(s). More specifically, the UE can use the feedback from the location server to determine (e.g., where the feedback is an error value or correction term) the correct measurement values corresponding to the reported measurement values. The UE can then train a machine learning model by matching the channel estimates used to derive the reported measurement values to the corresponding corrected measurement values. Once the machine learning model is trained, the UE can input the channel estimates obtained in subsequent positioning sessions to the machine learning model and report the measurements outputted (inferred) by the machine learning model.

In an aspect, a UE may request measurement error feedback messages from the location server. Alternatively, the location server may automatically provide a measurement error feedback message in response to receiving a measurement report from the UE (e.g., after receiving an LPP Provide Location Information message, as at stage 660 of FIG. 6), or at the end of every positioning session.

A similar measurement error feedback message may be conveyed from the location server to the involved TRPs (e.g., via New Radio positioning protocol type A (NRPPa) signaling). Such a feedback message may provide corrected measurements or correction terms for the corresponding reported uplink measurements, similar to the information provided to a UE for downlink measurements. For example, in the context of a multi-RTT positioning method, the location server may inform a TRP that its reported value of an RxTx time difference needs a certain amount of correction to be consistent with the final estimated location of the UE. This can provide a TRP with reference output for machine learning training, the same as for a UE.

Over time, the error feedback may be based on prior measurement reports that were themselves machine learning-based. In this case, a UE can use the error feedback to determine whether the machine learning model being used should be modified, retrained, or replaced. For example, if the error feedback indicates that a low number (e.g., less than a threshold) of reported measurements (from using the machine learning model) are incorrect (e.g., by more than a threshold), the UE may determine that the model should be retrained. Or if a large number (e.g., more than a threshold) of reported measurements are incorrect, or a low number of reported measurements are significantly incorrect, the UE may determine that the model should be replaced. Alternatively, the error feedback may indicate that the machine learning model is a good one, and in that case, the UE may share the trained model with other UEs or the network.

In an aspect, a measurement error feedback message may be for a specific inference instance (i.e., a specific set of inferred measurements), or may be an aggregate across several inference instances. For example, the error feedback may be an average error of the measurement quantity over a time window of using the machine learning model.

In an aspect, since a UE may update and/or replace a machine learning model over time, the UE may include, in a measurement report based on the machine learning model, an identifier of the machine learning model as well as the timestamp of the measurement report. Including an identifier of the machine learning model also allows the UE to run the observed channel estimates through multiple machine learning models. Based on the subsequent error feedback (which should indicate which errors are associated with which models), the UE can determine which model is the most accurate and discard or retrain the others.

As will be appreciated, although the foregoing has generally referred to PRS transmitted between a UE and a TRP, as will be appreciated, the disclosed techniques are equally applicable to sidelink PRS exchanged between two UEs. Further, although the foregoing has discussed the techniques in terms of UE-assisted positioning, as will be appreciated, the disclosed techniques are also applicable to UE-based positioning. In that case, the UE would perform the operations that the location server has been disclosed as performing. The UE may receive the locations of the involved (measured) TRPs in the assistance data for the positioning session (e.g., an LPP Provide Assistance Data message, as at stage 630 of FIG. 6). The UE may also provide error feedback reports to the location server or other network entity to apply to other machine learning models. Similarly, the location server operations could be performed at the TRP for uplink-based positioning, provided the TRP has the needed assistance data (e.g., estimated location of the UE).

Figure 9:
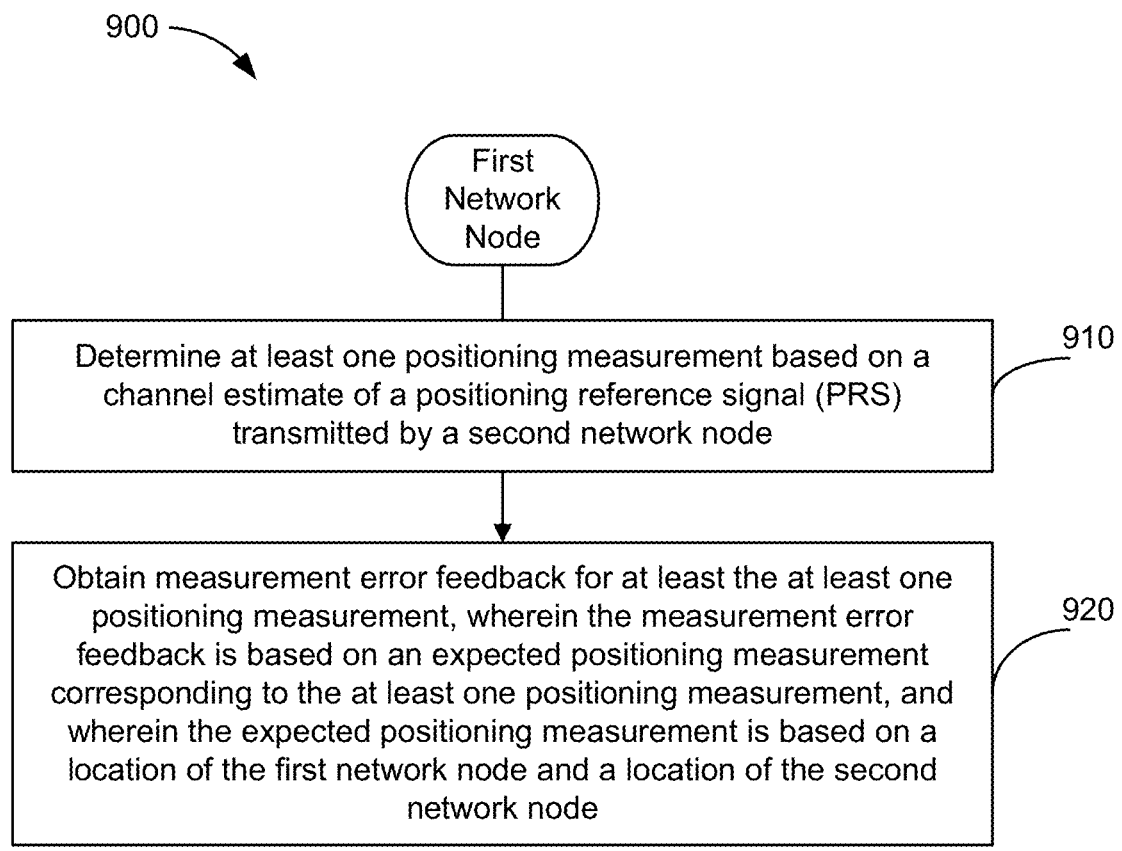
FIGS. 9 and 10 illustrate example methods of communication, according to aspects of the disclosure.

FIG. 9 illustrates an example method 900 of wireless communication, according to aspects of the disclosure. In an aspect, method 900 may be performed by a first network node (e.g., any of the UEs or TRPs described herein).

At 910, the first network node determines at least one positioning measurement based on a channel estimate of a PRS transmitted by a second network node (e.g., a UE or TRP). In an aspect, where the first network node is a UE, operation 910 may be performed by the one or more WWAN transceivers 310, the one or more processors 332, memory 340, and/or positioning component 342, any or all of which may be considered means for performing this operation. Where the first network node is a TRP, operation 910 may be performed by the one or more WWAN transceivers 350, the one or more processors 384, memory 386, and/or positioning component 388, any or all of which may be considered means for performing this operation.

At 920, the first network node obtains measurement error feedback for at least the at least one positioning measurement, wherein the measurement error feedback is based on an expected positioning measurement corresponding to the at least one positioning measurement, and wherein the expected positioning measurement is based on a location of the first network node and a location of the second network node. In an aspect, where the first network node is a UE, operation 920 may be performed by the one or more WWAN transceivers 310, the one or more processors 332, memory 340, and/or positioning component 342, any or all of which may be considered means for performing this operation. Where the first network node is a TRP, operation 920 may be performed by the one or more WWAN transceivers 350, the one or more processors 384, memory 386, and/or positioning component 388, any or all of which may be considered means for performing this operation.

Figure 10:
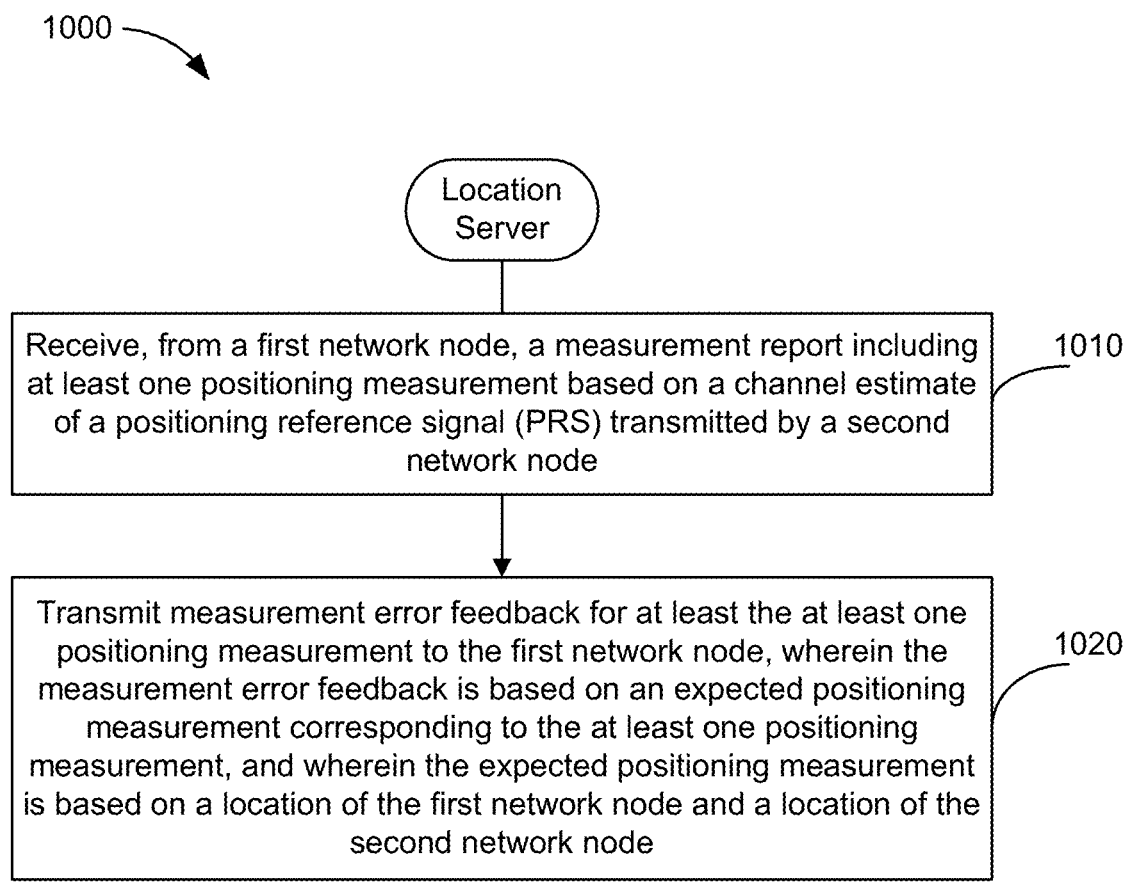

FIG. 10 illustrates an example method 1000 of communication, according to aspects of the disclosure. In an aspect, method 1000 may be performed by a location server (e.g., LMF 270).

At 1010, the location server receives, from a first network node (e.g., a UE or TRP), a measurement report including at least one positioning measurement based on a channel estimate of a PRS transmitted by a second network node. In an aspect, operation 1010 may be performed by the one or more network transceivers 390, the one or more processors 394, memory 396, and/or positioning component 398, any or all of which may be considered means for performing this operation.

At 1020, the location server transmits measurement error feedback for at least the at least one positioning measurement to the first network node, wherein the measurement error feedback is based on an expected positioning measurement corresponding to the at least one positioning measurement, and wherein the expected positioning measurement is based on a location of the first network node and a location of the second network node. In an aspect, operation 1020 may be performed by the one or more network transceivers 390, the one or more processors 394, memory 396, and/or positioning component 398, any or all of which may be considered means for performing this operation.

As will be appreciated, a technical advantage of the methods 900 and 1000 is enabling the first network node to train a machine learning model in order to generate and report more accurate measurements for positioning. Another advantage is that the methods enable performance monitoring of previously trained machine learning models to determine whether to fine-tune, retrain, or replace them.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a first network node, comprising: determining at least one positioning measurement based on a channel estimate of a positioning reference signal (PRS) transmitted by a second network node; and obtaining measurement error feedback for at least the at least one positioning measurement, wherein the measurement error feedback is based on an expected positioning measurement corresponding to the at least one positioning measurement, and wherein the expected positioning measurement is based on a location of the first network node and a location of the second network node.

Clause 2. The method of clause 1, wherein obtaining the measurement error feedback comprises: transmitting the at least one positioning measurement to a location server in a measurement report; and receiving the measurement error feedback from the location server in a measurement error feedback message.

Clause 3. The method of clause 2, wherein the measurement error feedback message includes: an identifier or a timestamp associated with the measurement report, a confidence value indicating a confidence in the measurement error feedback, or any combination thereof.

Clause 4. The method of any of clauses 2 to 3, wherein obtaining the measurement error feedback further comprises: transmitting a request to the location server for the measurement error feedback, wherein the measurement error feedback message is received in response to the request.

Clause 5. The method of any of clauses 2 to 4, wherein the measurement error feedback message is received in response to the measurement report.

Clause 6. The method of clause 1, wherein obtaining the measurement error feedback comprises determining the measurement error feedback at the first network node.

Clause 7. The method of clause 6, further comprising: receiving the location of the second network node from the location server; and determining the location of the first network node based on at least the at least one positioning measurement and the location of the second network node.

Clause 8. The method of any of clauses 1 to 7, wherein the measurement error feedback comprises: a difference between a value of the at least one positioning measurement and a value of the expected positioning measurement, the expected positioning measurement, or a correction term to be applied to the at least one positioning measurement to generate the expected positioning measurement.

Clause 9. The method of any of clauses 1 to 8, wherein: the at least one positioning measurement comprises a plurality of positioning measurements based on the channel estimate, and the measurement error feedback indicates which of the plurality of positioning measurements is most consistent with the expected positioning measurement.

Clause 10. The method of any of clauses 1 to 9, further comprising: training at least one machine learning model based on at least the channel estimate as an input to the at least one machine learning model and the expected positioning measurement as a reference output of the at least one machine learning model corresponding to the channel estimate.

Clause 11. The method of clause 10, wherein the measurement error feedback includes an identifier of the at least one machine learning model.

Clause 12. The method of any of clauses 10 to 11, further comprising: determining at least one second positioning measurement based on applying the at least one machine learning model to a second channel estimate of a second PRS.

Clause 13. The method of clause 12, further comprising: obtaining second measurement error feedback for at least the at least one second positioning measurement, wherein the second measurement error feedback is based on at least a second expected positioning measurement corresponding to the at least one second positioning measurement, and wherein the second expected positioning measurement is based on a second location of the first network node and a location of a network node transmitting the second PRS; determining whether a difference between the at least one second positioning measurement and the second expected positioning measurement is greater than a threshold; and based on the difference between the at least one second positioning measurement and the second expected positioning measurement being greater than the threshold, retraining or replacing the at least one machine learning model.

Clause 14. The method of clause 13, wherein the second measurement error feedback: applies to only the at least one second positioning measurement, or applies to a plurality of positioning measurements including the at least one second positioning measurement.

Clause 15. The method of any of clauses 13 to 14, wherein: the at least one second positioning measurement comprises a plurality of positioning measurements, the at least one machine learning model comprises a plurality of machine learning models, the plurality of positioning measurements is determined based on applying the plurality of machine learning models to the second channel estimate, and the second measurement error feedback indicates which of the plurality of machine learning models generated a positioning measurement of the plurality of positioning measurements most consistent with the second expected positioning measurement.

Clause 16. The method of any of clauses 1 to 15, wherein: the first network node is a user equipment (UE), the second network node is a transmission-reception point (TRP), the PRS is a downlink PRS, and the location of the first network node is estimated based on the at least one positioning measurement and the location of the second network node.

Clause 17. The method of any of clauses 1 to 16, wherein: the first network node is a first UE, the second network node is a second UE, the PRS is a sidelink PRS, and the location of the first network node is estimated based on the at least one positioning measurement and the location of the second network node.

Clause 18. The method of any of clauses 1 to 17, wherein: the first network node is a TRP, the second network node is a UE, the PRS is an uplink PRS, and the location of the second network node is estimated based on the at least one positioning measurement and the location of the first network node.

Clause 19. A method of communication performed by a location server, comprising: receiving, from a first network node, a measurement report including at least one positioning measurement based on a channel estimate of a positioning reference signal (PRS) transmitted by a second network node; and transmitting measurement error feedback for at least the at least one positioning measurement to the first network node, wherein the measurement error feedback is based on an expected positioning measurement corresponding to the at least one positioning measurement, and wherein the expected positioning measurement is based on a location of the first network node and a location of the second network node.

Clause 20. The method of clause 19, wherein the measurement error feedback message includes: an identifier or a timestamp associated with the measurement report, a confidence value indicating a confidence in the measurement error feedback, or any combination thereof.

Clause 21. The method of any of clauses 19 to 20, further comprising: receiving a request from the first network node for the measurement error feedback, wherein the measurement error feedback message is transmitted in response to the request.

Clause 22. The method of any of clauses 19 to 21, wherein the measurement error feedback message is transmitted in response to reception of the measurement report.

Clause 23. The method of any of clauses 19 to 22, wherein the measurement error feedback comprises: a difference between a value of the at least one positioning measurement and a value of the expected positioning measurement, the expected positioning measurement, or a correction term to be applied to the at least one positioning measurement to generate the expected positioning measurement.

Clause 24. The method of any of clauses 19 to 23, wherein: the at least one positioning measurement comprises a plurality of positioning measurements based on the channel estimate, and the measurement error feedback indicates which of the plurality of positioning measurements is most consistent with the expected positioning measurement.

Clause 25. The method of any of clauses 19 to 24, wherein: the first network node is a user equipment (UE), the second network node is a transmission-reception point (TRP), the PRS is a downlink PRS, and the location of the first network node is estimated based on the at least one positioning measurement and the location of the second network node.

Clause 26. The method of any of clauses 19 to 25, wherein: the first network node is a TRP, the second network node is a UE, the PRS is an uplink PRS, and the location of the second network node is estimated based on the at least one positioning measurement and the location of the first network node.

Clause 27. A first network node, comprising: a memory; at least one transceiver; and at least one processor communicatively coupled to the memory and the at least one transceiver, the at least one processor configured to: determine at least one positioning measurement based on a channel estimate of a positioning reference signal (PRS) transmitted by a second network node; and obtain measurement error feedback for at least the at least one positioning measurement, wherein the measurement error feedback is based on an expected positioning measurement corresponding to the at least one positioning measurement, and wherein the expected positioning measurement is based on a location of the first network node and a location of the second network node.

Clause 28. The first network node of clause 27, wherein the at least one processor configured to obtain the measurement error feedback comprises the at least one processor configured to: transmit, via the at least one transceiver, the at least one positioning measurement to a location server in a measurement report; and receive, via the at least one transceiver, the measurement error feedback from the location server in a measurement error feedback message.

Clause 29. The first network node of clause 28, wherein the measurement error feedback message includes: an identifier or a timestamp associated with the measurement report, a confidence value indicating a confidence in the measurement error feedback, or any combination thereof.

Clause 30. The first network node of any of clauses 28 to 29, wherein the at least one processor configured to obtain the measurement error feedback comprises the at least one processor configured to: transmit, via the at least one transceiver, a request to the location server for the measurement error feedback, wherein the measurement error feedback message is received in response to the request.

Clause 31. The first network node of any of clauses 28 to 30, wherein the measurement error feedback message is received in response to the measurement report.

Clause 32. The first network node of clause 27, wherein the at least one processor configured to obtain the measurement error feedback comprises the at least one processor configured to determine the measurement error feedback at the first network node.

Clause 33. The first network node of clause 32, wherein the at least one processor is further configured to: receive, via the at least one transceiver, the location of the second network node from the location server; and determine the location of the first network node based on at least the at least one positioning measurement and the location of the second network node.

Clause 34. The first network node of any of clauses 27 to 33, wherein the measurement error feedback comprises: a difference between a value of the at least one positioning measurement and a value of the expected positioning measurement, the expected positioning measurement, or a correction term to be applied to the at least one positioning measurement to generate the expected positioning measurement.

Clause 35. The first network node of any of clauses 27 to 34, wherein: the at least one positioning measurement comprises a plurality of positioning measurements based on the channel estimate, and the measurement error feedback indicates which of the plurality of positioning measurements is most consistent with the expected positioning measurement.

Clause 36. The first network node of any of clauses 27 to 35, wherein the at least one processor is further configured to: train at least one machine learning model based on at least the channel estimate as an input to the at least one machine learning model and the expected positioning measurement as a reference output of the at least one machine learning model corresponding to the channel estimate.

Clause 37. The first network node of clause 36, wherein the measurement error feedback includes an identifier of the at least one machine learning model.

Clause 38. The first network node of any of clauses 36 to 37, wherein the at least one processor is further configured to: determine at least one second positioning measurement based on applying the at least one machine learning model to a second channel estimate of a second PRS.

Clause 39. The first network node of clause 38, wherein the at least one processor is further configured to: obtain second measurement error feedback for at least the at least one second positioning measurement, wherein the second measurement error feedback is based on at least a second expected positioning measurement corresponding to the at least one second positioning measurement, and wherein the second expected positioning measurement is based on a second location of the first network node and a location of a network node transmitting the second PRS; determine whether a difference between the at least one second positioning measurement and the second expected positioning measurement is greater than a threshold; and retrain or replace the at least one machine learning model based on the difference between the at least one second positioning measurement and the second expected positioning measurement being greater than the threshold.

Clause 40. The first network node of clause 39, wherein the second measurement error feedback: applies to only the at least one second positioning measurement, or applies to a plurality of positioning measurements including the at least one second positioning measurement.

Clause 41. The first network node of any of clauses 39 to 40, wherein: the at least one second positioning measurement comprises a plurality of positioning measurements, the at least one machine learning model comprises a plurality of machine learning models, the plurality of positioning measurements is determined based on applying the plurality of machine learning models to the second channel estimate, and the second measurement error feedback indicates which of the plurality of machine learning models generated a positioning measurement of the plurality of positioning measurements most consistent with the second expected positioning measurement.

Clause 42. The first network node of any of clauses 27 to 41, wherein: the first network node is a user equipment (UE), the second network node is a transmission-reception point (TRP), the PRS is a downlink PRS, and the location of the first network node is estimated based on the at least one positioning measurement and the location of the second network node.

Clause 43. The first network node of any of clauses 27 to 42, wherein: the first network node is a first UE, the second network node is a second UE, the PRS is a sidelink PRS, and the location of the first network node is estimated based on the at least one positioning measurement and the location of the second network node.

Clause 44. The first network node of any of clauses 27 to 43, wherein: the first network node is a TRP, the second network node is a UE, the PRS is an uplink PRS, and the location of the second network node is estimated based on the at least one positioning measurement and the location of the first network node.

Clause 45. A location server, comprising: a memory; at least one transceiver; and at least one processor communicatively coupled to the memory and the at least one transceiver, the at least one processor configured to: receive, via the at least one transceiver, from a first network node, a measurement report including at least one positioning measurement based on a channel estimate of a positioning reference signal (PRS) transmitted by a second network node; and transmit, via the at least one transceiver, measurement error feedback for at least the at least one positioning measurement to the first network node, wherein the measurement error feedback is based on an expected positioning measurement corresponding to the at least one positioning measurement, and wherein the expected positioning measurement is based on a location of the first network node and a location of the second network node.

Clause 46. The location server of clause 45, wherein the measurement error feedback message includes: an identifier or a timestamp associated with the measurement report, a confidence value indicating a confidence in the measurement error feedback, or any combination thereof.

Clause 47. The location server of any of clauses 45 to 46, wherein the at least one processor is further configured to: receive, via the at least one transceiver, a request from the first network node for the measurement error feedback, wherein the measurement error feedback message is transmitted in response to the request.

Clause 48. The location server of any of clauses 45 to 47, wherein the measurement error feedback message is transmitted in response to reception of the measurement report.

Clause 49. The location server of any of clauses 45 to 48, wherein the measurement error feedback comprises: a difference between a value of the at least one positioning measurement and a value of the expected positioning measurement, the expected positioning measurement, or a correction term to be applied to the at least one positioning measurement to generate the expected positioning measurement.

Clause 50. The location server of any of clauses 45 to 49, wherein: the at least one positioning measurement comprises a plurality of positioning measurements based on the channel estimate, and the measurement error feedback indicates which of the plurality of positioning measurements is most consistent with the expected positioning measurement.

Clause 51. The location server of any of clauses 45 to 50, wherein: the first network node is a user equipment (UE), the second network node is a transmission-reception point (TRP), the PRS is a downlink PRS, and the location of the first network node is estimated based on the at least one positioning measurement and the location of the second network node.

Clause 52. The location server of any of clauses 45 to 51, wherein: the first network node is a TRP, the second network node is a UE, the PRS is an uplink PRS, and the location of the second network node is estimated based on the at least one positioning measurement and the location of the first network node.

Clause 53. A first network node, comprising: means for determining at least one positioning measurement based on a channel estimate of a positioning reference signal (PRS) transmitted by a second network node; and means for obtaining measurement error feedback for at least the at least one positioning measurement, wherein the measurement error feedback is based on an expected positioning measurement corresponding to the at least one positioning measurement, and wherein the expected positioning measurement is based on a location of the first network node and a location of the second network node.

Clause 54. The first network node of clause 53, wherein the means for obtaining the measurement error feedback comprises: means for transmitting the at least one positioning measurement to a location server in a measurement report; and means for receiving the measurement error feedback from the location server in a measurement error feedback message.

Clause 55. The first network node of clause 54, wherein the measurement error feedback message includes: an identifier or a timestamp associated with the measurement report, a confidence value indicating a confidence in the measurement error feedback, or any combination thereof.

Clause 56. The first network node of any of clauses 54 to 55, wherein the means for obtaining the measurement error feedback further comprises: means for transmitting a request to the location server for the measurement error feedback, wherein the measurement error feedback message is received in response to the request.

Clause 57. The first network node of any of clauses 54 to 56, wherein the measurement error feedback message is received in response to the measurement report.

Clause 58. The first network node of clause 53, wherein the means for obtaining the measurement error feedback comprises means for determining the measurement error feedback at the first network node.

Clause 59. The first network node of clause 58, further comprising: means for receiving the location of the second network node from the location server; and means for determining the location of the first network node based on at least the at least one positioning measurement and the location of the second network node.

Clause 60. The first network node of any of clauses 53 to 59, wherein the measurement error feedback comprises: a difference between a value of the at least one positioning measurement and a value of the expected positioning measurement, the expected positioning measurement, or a correction term to be applied to the at least one positioning measurement to generate the expected positioning measurement.

Clause 61. The first network node of any of clauses 53 to 60, wherein: the at least one positioning measurement comprises a plurality of positioning measurements based on the channel estimate, and the measurement error feedback indicates which of the plurality of positioning measurements is most consistent with the expected positioning measurement.

Clause 62. The first network node of any of clauses 53 to 61, further comprising: means for training at least one machine learning model based on at least the channel estimate as an input to the at least one machine learning model and the expected positioning measurement as a reference output of the at least one machine learning model corresponding to the channel estimate.

Clause 63. The first network node of clause 62, wherein the measurement error feedback includes an identifier of the at least one machine learning model.

Clause 64. The first network node of any of clauses 62 to 63, further comprising: means for determining at least one second positioning measurement based on applying the at least one machine learning model to a second channel estimate of a second PRS.

Clause 65. The first network node of clause 64, further comprising: means for obtaining second measurement error feedback for at least the at least one second positioning measurement, wherein the second measurement error feedback is based on at least a second expected positioning measurement corresponding to the at least one second positioning measurement, and wherein the second expected positioning measurement is based on a second location of the first network node and a location of a network node transmitting the second PRS; means for determining whether a difference between the at least one second positioning measurement and the second expected positioning measurement is greater than a threshold; and means for retraining or replacing the at least one machine learning model based on the difference between the at least one second positioning measurement and the second expected positioning measurement being greater than the threshold.

Clause 66. The first network node of clause 65, wherein the second measurement error feedback: applies to only the at least one second positioning measurement, or applies to a plurality of positioning measurements including the at least one second positioning measurement.

Clause 67. The first network node of any of clauses 65 to 66, wherein: the at least one second positioning measurement comprises a plurality of positioning measurements, the at least one machine learning model comprises a plurality of machine learning models, the plurality of positioning measurements is determined based on applying the plurality of machine learning models to the second channel estimate, and the second measurement error feedback indicates which of the plurality of machine learning models generated a positioning measurement of the plurality of positioning measurements most consistent with the second expected positioning measurement.

Clause 68. The first network node of any of clauses 53 to 67, wherein: the first network node is a user equipment (UE), the second network node is a transmission-reception point (TRP), the PRS is a downlink PRS, and the location of the first network node is estimated based on the at least one positioning measurement and the location of the second network node.

Clause 69. The first network node of any of clauses 53 to 68, wherein: the first network node is a first UE, the second network node is a second UE, the PRS is a sidelink PRS, and the location of the first network node is estimated based on the at least one positioning measurement and the location of the second network node.

Clause 70. The first network node of any of clauses 53 to 69, wherein: the first network node is a TRP, the second network node is a UE, the PRS is an uplink PRS, and the location of the second network node is estimated based on the at least one positioning measurement and the location of the first network node.

Clause 71. A location server, comprising: means for receiving, from a first network node, a measurement report including at least one positioning measurement based on a channel estimate of a positioning reference signal (PRS) transmitted by a second network node; and means for transmitting measurement error feedback for at least the at least one positioning measurement to the first network node, wherein the measurement error feedback is based on an expected positioning measurement corresponding to the at least one positioning measurement, and wherein the expected positioning measurement is based on a location of the first network node and a location of the second network node.

Clause 72. The location server of clause 71, wherein the measurement error feedback message includes: an identifier or a timestamp associated with the measurement report, a confidence value indicating a confidence in the measurement error feedback, or any combination thereof.

Clause 73. The location server of any of clauses 71 to 72, further comprising: means for receiving a request from the first network node for the measurement error feedback, wherein the measurement error feedback message is transmitted in response to the request.

Clause 74. The location server of any of clauses 71 to 73, wherein the measurement error feedback message is transmitted in response to reception of the measurement report.

Clause 75. The location server of any of clauses 71 to 74, wherein the measurement error feedback comprises: a difference between a value of the at least one positioning measurement and a value of the expected positioning measurement, the expected positioning measurement, or a correction term to be applied to the at least one positioning measurement to generate the expected positioning measurement.

Clause 76. The location server of any of clauses 71 to 75, wherein: the at least one positioning measurement comprises a plurality of positioning measurements based on the channel estimate, and the measurement error feedback indicates which of the plurality of positioning measurements is most consistent with the expected positioning measurement.

Clause 77. The location server of any of clauses 71 to 76, wherein: the first network node is a user equipment (UE), the second network node is a transmission-reception point (TRP), the PRS is a downlink PRS, and the location of the first network node is estimated based on the at least one positioning measurement and the location of the second network node.

Clause 78. The location server of any of clauses 71 to 77, wherein: the first network node is a TRP, the second network node is a UE, the PRS is an uplink PRS, and the location of the second network node is estimated based on the at least one positioning measurement and the location of the first network node.

Clause 79. A non-transitory computer-readable medium storing computer-executable instructions that, when executed by a first network node, cause the first network node to: determine at least one positioning measurement based on a channel estimate of a positioning reference signal (PRS) transmitted by a second network node; and obtain measurement error feedback for at least the at least one positioning measurement, wherein the measurement error feedback is based on an expected positioning measurement corresponding to the at least one positioning measurement, and wherein the expected positioning measurement is based on a location of the first network node and a location of the second network node.

Clause 80. The non-transitory computer-readable medium of clause 79, wherein the computer-executable instructions that, when executed by the first network node, cause the first network node to obtain the measurement error feedback comprise computer-executable instructions that, when executed by the first network node, cause the first network node to: transmit the at least one positioning measurement to a location server in a measurement report; and receive the measurement error feedback from the location server in a measurement error feedback message.

Clause 81. The non-transitory computer-readable medium of clause 80, wherein the measurement error feedback message includes: an identifier or a timestamp associated with the measurement report, a confidence value indicating a confidence in the measurement error feedback, or any combination thereof.

Clause 82. The non-transitory computer-readable medium of any of clauses 80 to 81, wherein the computer-executable instructions that, when executed by the first network node, cause the first network node to obtain the measurement error feedback comprise computer-executable instructions that, when executed by the first network node, cause the first network node to: transmit a request to the location server for the measurement error feedback, wherein the measurement error feedback message is received in response to the request.

Clause 83. The non-transitory computer-readable medium of any of clauses 80 to 82, wherein the measurement error feedback message is received in response to the measurement report.

Clause 84. The non-transitory computer-readable medium of clause 79, wherein the computer-executable instructions that, when executed by the first network node, cause the first network node to obtain the measurement error feedback comprise computer-executable instructions that, when executed by the first network node, cause the first network node to determine the measurement error feedback at the first network node.

Clause 85. The non-transitory computer-readable medium of clause 84, further comprising computer-executable instructions that, when executed by the first network node, cause the first network node to: receive the location of the second network node from the location server; and determine the location of the first network node based on at least the at least one positioning measurement and the location of the second network node.

Clause 86. The non-transitory computer-readable medium of any of clauses 79 to 85, wherein the measurement error feedback comprises: a difference between a value of the at least one positioning measurement and a value of the expected positioning measurement, the expected positioning measurement, or a correction term to be applied to the at least one positioning measurement to generate the expected positioning measurement.

Clause 87. The non-transitory computer-readable medium of any of clauses 79 to 86, wherein: the at least one positioning measurement comprises a plurality of positioning measurements based on the channel estimate, and the measurement error feedback indicates which of the plurality of positioning measurements is most consistent with the expected positioning measurement.

Clause 88. The non-transitory computer-readable medium of any of clauses 79 to 87, further comprising computer-executable instructions that, when executed by the first network node, cause the first network node to: train at least one machine learning model based on at least the channel estimate as an input to the at least one machine learning model and the expected positioning measurement as a reference output of the at least one machine learning model corresponding to the channel estimate.

Clause 89. The non-transitory computer-readable medium of clause 88, wherein the measurement error feedback includes an identifier of the at least one machine learning model.

Clause 90. The non-transitory computer-readable medium of any of clauses 88 to 89, further comprising computer-executable instructions that, when executed by the first network node, cause the first network node to: determine at least one second positioning measurement based on applying the at least one machine learning model to a second channel estimate of a second PRS.

Clause 91. The non-transitory computer-readable medium of clause 90, further comprising computer-executable instructions that, when executed by the first network node, cause the first network node to: obtain second measurement error feedback for at least the at least one second positioning measurement, wherein the second measurement error feedback is based on at least a second expected positioning measurement corresponding to the at least one second positioning measurement, and wherein the second expected positioning measurement is based on a second location of the first network node and a location of a network node transmitting the second PRS; determine whether a difference between the at least one second positioning measurement and the second expected positioning measurement is greater than a threshold; and retrain or replace the at least one machine learning model based on the difference between the at least one second positioning measurement and the second expected positioning measurement being greater than the threshold.

Clause 92. The non-transitory computer-readable medium of clause 91, wherein the second measurement error feedback: applies to only the at least one second positioning measurement, or applies to a plurality of positioning measurements including the at least one second positioning measurement.

Clause 93. The non-transitory computer-readable medium of any of clauses 91 to 92, wherein: the at least one second positioning measurement comprises a plurality of positioning measurements, the at least one machine learning model comprises a plurality of machine learning models, the plurality of positioning measurements is determined based on applying the plurality of machine learning models to the second channel estimate, and the second measurement error feedback indicates which of the plurality of machine learning models generated a positioning measurement of the plurality of positioning measurements most consistent with the second expected positioning measurement.

Clause 94. The non-transitory computer-readable medium of any of clauses 79 to 93, wherein: the first network node is a user equipment (UE), the second network node is a transmission-reception point (TRP), the PRS is a downlink PRS, and the location of the first network node is estimated based on the at least one positioning measurement and the location of the second network node.

Clause 95. The non-transitory computer-readable medium of any of clauses 79 to 94, wherein: the first network node is a first UE, the second network node is a second UE, the PRS is a sidelink PRS, and the location of the first network node is estimated based on the at least one positioning measurement and the location of the second network node.

Clause 96. The non-transitory computer-readable medium of any of clauses 79 to 95, wherein: the first network node is a TRP, the second network node is a UE, the PRS is an uplink PRS, and the location of the second network node is estimated based on the at least one positioning measurement and the location of the first network node.

Clause 97. A non-transitory computer-readable medium storing computer-executable instructions that, when executed by a location server, cause the location server to: receive, from a first network node, a measurement report including at least one positioning measurement based on a channel estimate of a positioning reference signal (PRS) transmitted by a second network node; and transmit measurement error feedback for at least the at least one positioning measurement to the first network node, wherein the measurement error feedback is based on an expected positioning measurement corresponding to the at least one positioning measurement, and wherein the expected positioning measurement is based on a location of the first network node and a location of the second network node.

Clause 98. The non-transitory computer-readable medium of clause 97, wherein the measurement error feedback message includes: an identifier or a timestamp associated with the measurement report, a confidence value indicating a confidence in the measurement error feedback, or any combination thereof.

Clause 99. The non-transitory computer-readable medium of any of clauses 97 to 98, further comprising computer-executable instructions that, when executed by the location server, cause the location server to: receive a request from the first network node for the measurement error feedback, wherein the measurement error feedback message is transmitted in response to the request.

Clause 100. The non-transitory computer-readable medium of any of clauses 97 to 99, wherein the measurement error feedback message is transmitted in response to reception of the measurement report.

Clause 101. The non-transitory computer-readable medium of any of clauses 97 to 100, wherein the measurement error feedback comprises: a difference between a value of the at least one positioning measurement and a value of the expected positioning measurement, the expected positioning measurement, or a correction term to be applied to the at least one positioning measurement to generate the expected positioning measurement.

Clause 102. The non-transitory computer-readable medium of any of clauses 97 to 101, wherein: the at least one positioning measurement comprises a plurality of positioning measurements based on the channel estimate, and the measurement error feedback indicates which of the plurality of positioning measurements is most consistent with the expected positioning measurement.

Clause 103. The non-transitory computer-readable medium of any of clauses 97 to 102, wherein: the first network node is a user equipment (UE), the second network node is a transmission-reception point (TRP), the PRS is a downlink PRS, and the location of the first network node is estimated based on the at least one positioning measurement and the location of the second network node.

Clause 104. The non-transitory computer-readable medium of any of clauses 97 to 103, wherein: the first network node is a TRP, the second network node is a UE, the PRS is an uplink PRS, and the location of the second network node is estimated based on the at least one positioning measurement and the location of the first network node.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a first network node, comprising:
   determining at least one positioning measurement based on a channel estimate of a positioning reference signal (PRS) transmitted by a second network node; and
   obtaining measurement error feedback for at least the at least one positioning measurement, wherein the measurement error feedback is based on an expected positioning measurement corresponding to the at least one positioning measurement, wherein the expected positioning measurement is based on a location of the first network node and a location of the second network node, and wherein the measurement error feedback comprises (1) a difference between a value of the at least one positioning measurement and a value of the expected positioning measurement, (2) the expected positioning measurement, or (3) a correction term to be applied to the at least one positioning measurement to generate the expected positioning measurement.

2. The method of claim 1, wherein obtaining the measurement error feedback comprises:
   transmitting the at least one positioning measurement to a location server in a measurement report; and
   receiving the measurement error feedback from the location server in a measurement error feedback message.

3. The method of claim 2, wherein the measurement error feedback message includes:
   an identifier or a timestamp associated with the measurement report,
   a confidence value indicating a confidence in the measurement error feedback, or
   any combination thereof.

4. The method of claim 2, wherein obtaining the measurement error feedback further comprises:
   transmitting a request to the location server for the measurement error feedback, wherein the measurement error feedback message is received in response to the request.

5. The method of claim 2, wherein the measurement error feedback message is received in response to the measurement report.

6. The method of claim 1, wherein obtaining the measurement error feedback comprises determining the measurement error feedback at the first network node.

7. The method of claim 6, further comprising:
   receiving the location of the second network node from a location server; and determining the location of the first network node based on at least the at least one positioning measurement and the location of the second network node.

8. The method of claim 1, wherein:
the at least one positioning measurement comprises a plurality of positioning measurements based on the channel estimate, and
the measurement error feedback indicates which of the plurality of positioning measurements is most consistent with the expected positioning measurement.

9. The method of claim 1, further comprising:
training at least one machine learning model based on at least the channel estimate as an input to the at least one machine learning model and the expected positioning measurement as a reference output of the at least one machine learning model corresponding to the channel estimate.

10. The method of claim 9, wherein the measurement error feedback includes an identifier of the at least one machine learning model.

11. The method of claim 9, further comprising:
determining at least one second positioning measurement based on applying the at least one machine learning model to a second channel estimate of a second PRS.

12. The method of claim 11, further comprising:
obtaining second measurement error feedback for at least the at least one second positioning measurement, wherein the second measurement error feedback is based on at least a second expected positioning measurement corresponding to the at least one second positioning measurement, and wherein the second expected positioning measurement is based on a second location of the first network node and a location of a network node transmitting the second PRS;
determining whether a difference between the at least one second positioning measurement and the second expected positioning measurement is greater than a threshold; and
based on the difference between the at least one second positioning measurement and the second expected positioning measurement being greater than the threshold, retraining or replacing the at least one machine learning model.

13. The method of claim 12, wherein the second measurement error feedback:
applies to only the at least one second positioning measurement, or
applies to a plurality of positioning measurements including the at least one second positioning measurement.

14. The method of claim 12, wherein:
the at least one second positioning measurement comprises a plurality of positioning measurements,
the at least one machine learning model comprises a plurality of machine learning models,
the plurality of positioning measurements is determined based on applying the plurality of machine learning models to the second channel estimate, and
the second measurement error feedback indicates which of the plurality of machine learning models generated a positioning measurement of the plurality of positioning measurements most consistent with the second expected positioning measurement.

15. The method of claim 1, wherein:
the first network node is a user equipment (UE),
the second network node is a transmission-reception point (TRP),
the PRS is a downlink PRS, and
the location of the first network node is estimated based on the at least one positioning measurement and the location of the second network node.

16. The method of claim 1, wherein:
the first network node is a first UE,
the second network node is a second UE,
the PRS is a sidelink PRS, and
the location of the first network node is estimated based on the at least one positioning measurement and the location of the second network node.

17. The method of claim 1, wherein:
the first network node is a TRP,
the second network node is a UE,
the PRS is an uplink PRS, and
the location of the second network node is estimated based on the at least one positioning measurement and the location of the first network node.

18. A method of communication performed by a location server, comprising:
receiving, from a first network node, a measurement report including at least one positioning measurement based on a channel estimate of a positioning reference signal (PRS) transmitted by a second network node; and
transmitting measurement error feedback for at least the at least one positioning measurement to the first network node, wherein the measurement error feedback is based on an expected positioning measurement corresponding to the at least one positioning measurement, wherein the expected positioning measurement is based on a location of the first network node and a location of the second network node, and wherein the measurement error feedback comprises (1) a difference between a value of the at least one positioning measurement and a value of the expected positioning measurement, (2) the expected positioning measurement, or (3) a correction term to be applied to the at least one positioning measurement to generate the expected positioning measurement.

19. The method of claim 18, wherein the measurement error feedback includes:
an identifier or a timestamp associated with the measurement report,
a confidence value indicating a confidence in the measurement error feedback, or
any combination thereof.

20. The method of claim 18, further comprising:
receiving a request from the first network node for the measurement error feedback, wherein the measurement error feedback is transmitted in response to the request.

21. The method of claim 18, wherein the measurement error feedback is transmitted in response to reception of the measurement report.

22. The method of claim 18, wherein:
the at least one positioning measurement comprises a plurality of positioning measurements based on the channel estimate, and
the measurement error feedback indicates which of the plurality of positioning measurements is most consistent with the expected positioning measurement.

23. The method of claim 18, wherein:
the first network node is a user equipment (UE),
the second network node is a transmission-reception point (TRP), the PRS is a downlink PRS, and the location of the first network node is estimated based on the at least one positioning measurement and the location of the second network node.

24. The method of claim 18, wherein:

the first network node is a TRP, the second network node is a UE, the PRS is an uplink PRS, and the location of the second network node is estimated based on the at least one positioning measurement and the location of the first network node.

25. A first network node comprising:

one or more memories;

one or more transceivers; and one or more processors communicatively coupled to the one or more memories and the one or more transceivers, the one or more processors, either alone or in combination, configured to:

determine at least one positioning measurement based on a channel estimate of a positioning reference signal (PRS) transmitted by a second network node; and obtain measurement error feedback for at least the at least one positioning measurement, wherein the measurement error feedback is based on an expected positioning measurement corresponding to the at least one positioning measurement, wherein the expected positioning measurement is based on a location of the first network node and a location of the second network node, and wherein the measurement error feedback comprises (1) a difference between a value of the at least one positioning measurement and a value of the expected positioning measurement, (2) the expected positioning measurement, or (3) a correction term to be applied to the at least one positioning measurement to generate the expected positioning measurement.

26. The first network node of claim 25, wherein the one or more processors configured to obtain the measurement error feedback comprises the one or more processors, either alone or in combination, configured to:

transmit, via the one or more transceivers, the at least one positioning measurement to a location server in a measurement report; and receive, via the one or more transceivers, the measurement error feedback from the location server in a measurement error feedback message.

27. The first network node of claim 25, wherein the one or more processors, either alone or in combination, are further configured to:

train at least one machine learning model based on at least the channel estimate as an input to the at least one machine learning model and the expected positioning measurement as a reference output of the at least one machine learning model corresponding to the channel estimate.

28. A location server comprising:

one or more memories;

one or more transceivers; and one or more processors communicatively coupled to the one or more memories and the one or more transceivers, the one or more processors, either alone or in combination, configured to:

receive, via the one or more transceivers, from a first network node, a measurement report including at least one positioning measurement based on a channel estimate of a positioning reference signal (PRS) transmitted by a second network node; and transmit, via the one or more transceivers, measurement error feedback for at least the at least one positioning measurement to the first network node, wherein the measurement error feedback is based on an expected positioning measurement corresponding to the at least one positioning measurement, wherein the expected positioning measurement is based on a location of the first network node and a location of the second network node, and wherein the measurement error feedback comprises (1) a difference between a value of the at least one positioning measurement and a value of the expected positioning measurement, (2) the expected positioning measurement, or (3) a correction term to be applied to the at least one positioning measurement to generate the expected positioning measurement.

* * * * *